(12) United States Patent
Shirakawa et al.

(10) Patent No.: US 7,631,493 B2
(45) Date of Patent: Dec. 15, 2009

(54) EXHAUST GAS PURIFICATION CONTROL OF DIESEL ENGINE

(75) Inventors: Takashi Shirakawa, Yokohama (JP); Yasutaka Ishibashi, Yokohama (JP); Hikari Todoroki, Fujisawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 579 days.

(21) Appl. No.: 11/315,154

(22) Filed: Dec. 23, 2005

(65) Prior Publication Data

US 2006/0137327 A1   Jun. 29, 2006

(30) Foreign Application Priority Data

Dec. 28, 2004   (JP) ............... 2004-379560

(51) Int. Cl.
   *F01N 3/00*   (2006.01)
(52) U.S. Cl. ............... 60/297; 60/285; 60/295; 60/303; 422/171; 422/177; 422/182
(58) Field of Classification Search ............ 60/274, 60/285, 295, 297, 303, 311; 422/170, 171, 422/177, 182, 183
   See application file for complete search history.

(56) References Cited

U.S. PATENT DOCUMENTS

| | | | | |
|---|---|---|---|---|
| 5,974,791 A | * | 11/1999 | Hirota et al. ............... | 60/276 |
| 6,237,326 B1 | * | 5/2001 | Russell ............... | 60/274 |
| 6,490,857 B2 | * | 12/2002 | Sasaki ............... | 60/278 |
| 6,854,265 B2 | * | 2/2005 | Saito et al. ............... | 60/295 |
| 7,017,337 B2 | * | 3/2006 | Plote et al. ............... | 60/295 |
| 7,146,804 B2 | * | 12/2006 | Yahata et al. ............... | 60/295 |
| 2003/0113249 A1 | * | 6/2003 | Hepburn et al. ............ | 423/242.1 |

FOREIGN PATENT DOCUMENTS

JP   2002-371827 A   12/2002

* cited by examiner

*Primary Examiner*—Tu M Nguyen
(74) *Attorney, Agent, or Firm*—Foley & Lardner LLP

(57) ABSTRACT

A diesel particulate filter (14) which traps particulate matter and a NOx trap catalyst (13) which traps nitrogen oxides are installed in series in an exhaust passage (10) of a diesel engine (1). A controller (21) calculates a particulate matter deposition amount in the diesel particulate filter (14) (S4). The controller (21), when the particulate matter deposition amount exceeds a first predetermined amount (PM2), prevents sharp increase of the particulate matter deposition amount by prohibiting rich spike where the oxygen concentration of the exhaust gas is controlled to a value corresponding to a rich air-fuel ratio in order to regenerate the NOx trap catalyst (13) (S301, S302, S306), and prevents the particulate matter deposition amount of the diesel particulate filter (14) from reaching a limit.

8 Claims, 13 Drawing Sheets

4 INTER COOLER
8 COMMON RAIL
9 FUEL INJECTOR
13 NOx TRAP CATALYST
14 DPF
22 ACCELERATOR OPENING SENSOR
23 CATALYST TEMPERATURE SENSOR
24 EXHAUST GAS PRESSURE SENSOR
25 DPF TEMPERATURE SENSOR
26 UNIVERSAL EXHAUST GAS OXYGEN SENSOR

4 INTER COOLER
8 COMMON RAIL
9 FUEL INJECTOR
13 NOx TRAP CATALYST
14 DPF
22 ACCELERATOR OPENING SENSOR
23 CATALYST TEMPERATURE SENSOR
24 EXHAUST GAS PRESSURE SENSOR
25 DPF TEMPERATURE SENSOR
26 UNIVERSAL EXHAUST GAS OXYGEN SENSOR

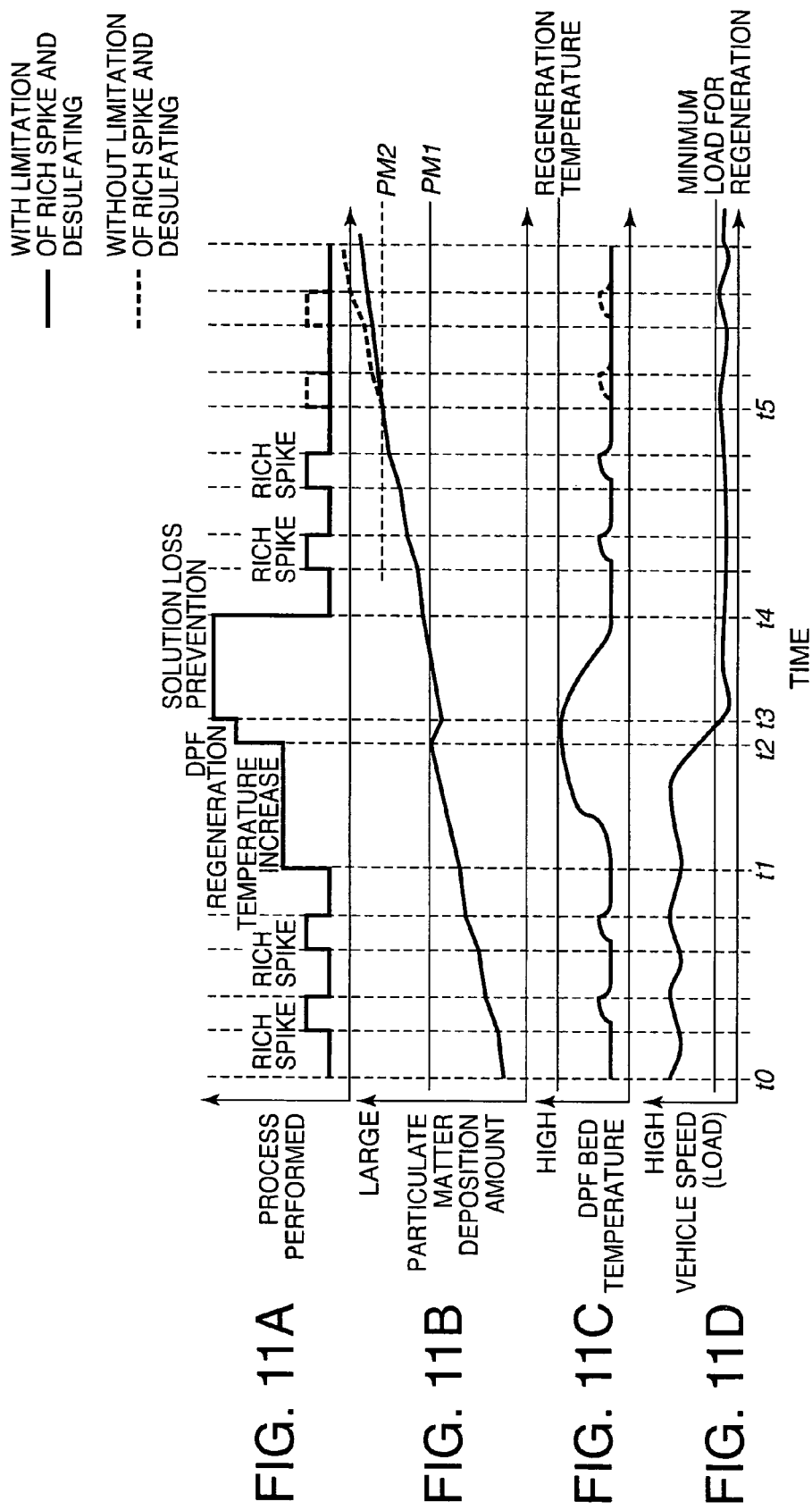

EXHAUST GAS PURIFICATION CONTROL OF DIESEL ENGINE

FIELD OF THE INVENTION

This invention relates to exhaust gas purification control of a diesel engine.

BACKGROUND OF THE INVENTION

A diesel particulate filter (DPF) which traps particulate matter in the exhaust gas of a diesel engine for vehicles has a particulate matter deposition limit, and when the deposition amount exceeds the limit, it becomes impossible to trap more particulate matter. Therefore, when the deposition amount reaches a predetermined level, a regeneration operation is performed to raise the temperature of the DPF, burn and remove the trapped particulate matter, and enable the DPF to trap particulate matter again.

When the vehicle is running at low speed, the exhaust gas temperature is suppressed low. Since, in the case of a regenerative device which raises the temperature of the DPF by increasing the exhaust gas temperature, regeneration of the DPF cannot be performed when the vehicle is running at low speed, and as a result, a large amount of particulate matter is deposited on the DPF.

Subsequently, if the DPF is regenerated when regeneration of the DPF becomes possible, the DPF may be overheated because a large particulate matter amount deposited on the DPF burns all at once, and heat deterioration of the DPF may occur.

To prevent such a fault, when there is a large DPF particulate matter deposition amount, JP2002-371827A published by the Japan Patent Office in 2002 proposes changing the engine running conditions so that a temperature environment where the particulate matter burns slowly may be obtained.

SUMMARY OF THE INVENTION

Another diesel engine exhaust gas purification device, in addition to the DPF, is a NOx trap catalyst which traps nitrogen oxides (NOx) in the exhaust gas. The NOx trap catalyst has the function of trapping NOx in the exhaust gas when the oxygen concentration of the exhaust gas corresponds to a lean air-fuel ratio, and of releasing and reducing NOx when the oxygen concentration of the exhaust gas corresponds to a rich air-fuel ratio. In the NOx trap catalyst, if the NOx deposition amount increases, the air-fuel ratio of the air-fuel mixture burnt by the diesel engine changes to a rich air-fuel ratio. Due to this operation NOx is released from the NOx trap catalyst, reacts with the reducing agent in the exhaust gas whereby it is reduced, and is discharged as nitrogen and carbon dioxide.

This operation is called regeneration of the NOx trap catalyst. The NOx trap catalyst traps not only NOx but also sulfur oxides (SOx). SOx deposited on the NOx trap catalyst reduces the NOx trap capability of the NOx trap catalyst. This phenomenon is called sulfur poisoning of the NOx trap catalyst. A temperature rise causes SOx deposited on the NOx trap catalyst to be released from the NOx trap catalyst. If the sulfur poisoning of the NOx trap catalyst exceeds a predetermined amount, the exhaust gas temperature is increased so that SOx is released from the NOx trap catalyst. This operation is called desulfating.

When the air-fuel ratio is made rich to perform regeneration or desulfating of the NOx trap catalyst, the engine particulate matter discharge amount will increase. Also, the starting and finishing operating conditions are different for regeneration of the DPF, regeneration of the NOx trap catalyst and desulfating of the NOx trap catalyst, respectively. If two or more of these operations overlap, the following inconveniences may occur. When regeneration of the DPF is not possible, or when regeneration of the DPF stops before complete regeneration of the DPF after regeneration has started, a large amount of particulate matter may remain in the DPF.

If regeneration or desulfating of the NOx trap catalyst is performed in this state, the particulate matter deposition amount of the DPF will further increase due to the large amount of particulate matter in the exhaust gas arising from the rich air-fuel ratio. As a result, if the deposition amount exceeds the trap limit, it not only may lead to an increase of exhaust resistance, but it may also make vehicle running difficult.

It is therefore an object of this invention to follow and prevent too much increase in the particulate matter deposition amount of the DPF by integrative control of regeneration of the DPF and operation of the NOx trap catalyst.

In order to achieve the above object, this invention provides an exhaust gas purification device for a diesel engine, comprising a diesel particulate filter which traps particulate matter contained in an exhaust gas of the diesel engine, a device which adjusts an oxygen concentration of the exhaust gas flowing into the diesel particulate filter, and a controller programmed to calculate a particulate matter deposition amount in the diesel particulate filter, and control the adjusting device, when the particulate matter deposition amount exceeds a first predetermined amount, so that the oxygen concentration of the exhaust gas does not become a value corresponding to a rich air-fuel ratio.

This invention also provides an exhaust gas purification method for a diesel engine, wherein the engine comprises a diesel particulate filter which traps particulate matter contained in an exhaust gas of the diesel engine, and a device which adjusts an oxygen concentration of the exhaust gas flowing into the diesel particulate filter. The method comprises calculating a particulate matter deposition amount in the diesel particulate filter, and controlling the adjusting device, when the particulate matter deposition amount exceeds a first predetermined amount, so that the oxygen concentration of the exhaust gas does not become a value corresponding to a rich air-fuel ratio.

The details as well as other features and advantages of this invention are set forth in the remainder of the specification and are shown in the accompanying drawings.

BRIEF DESCRIPTION OF THE DRAWINGS

FIGS. 11A-11D are timing charts describing the execution result of the exhaust gas purification control routine.

DESCRIPTION OF THE PREFERRED EMBODIMENTS

Figure 1:
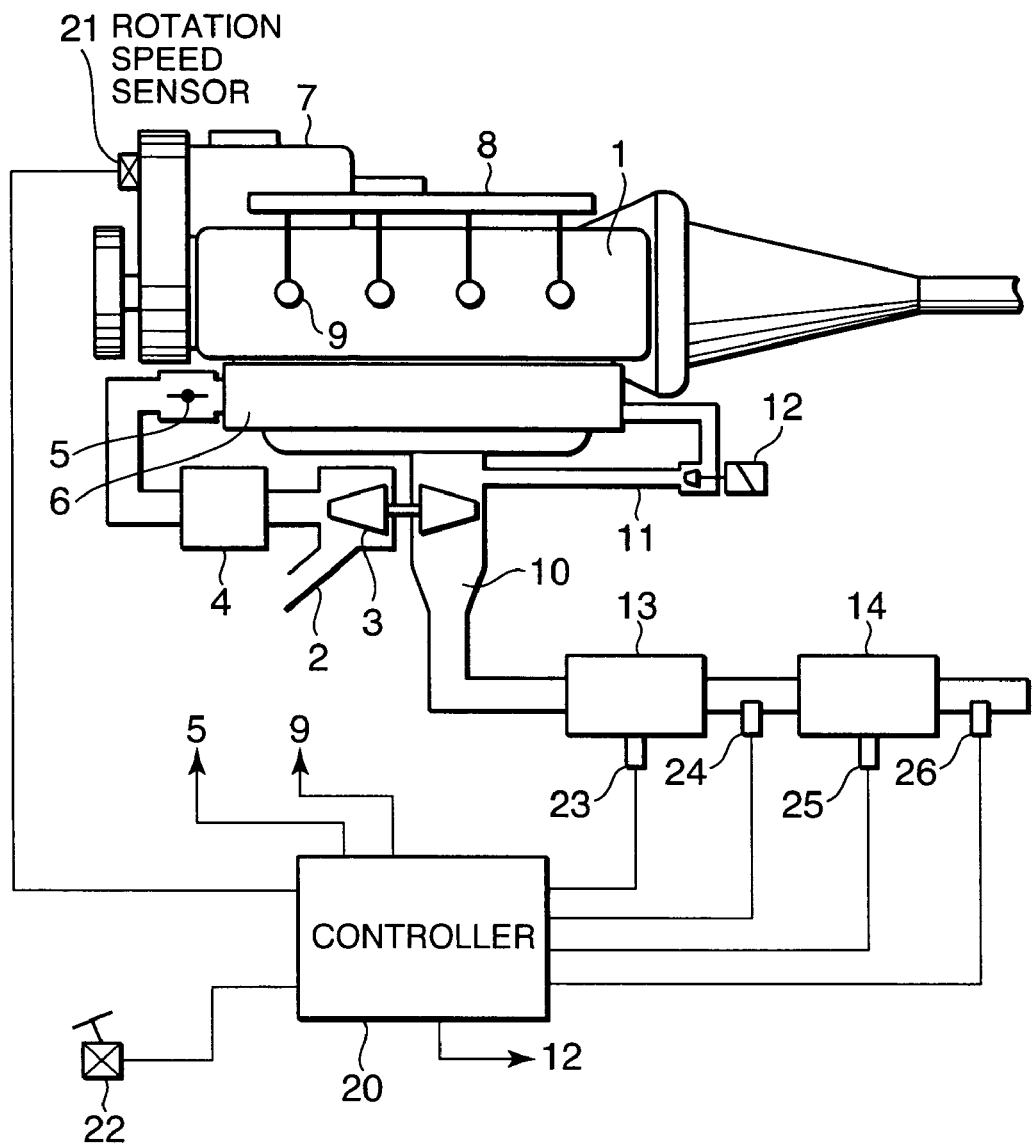
FIG. 1 is a schematic diagram of an exhaust gas purification control device of a diesel engine according to this invention.

Referring to FIG. 1 of the drawings, a diesel engine 1 for a vehicle is provided with an intake passage 2 and exhaust passage 10. An intake compressor of a variable nozzle turbocharger 3 is disposed in the intake passage 2. In the exhaust passage 10, an exhaust turbine of the variable nozzle turbocharger 3 is provided. The variable nozzle turbocharger 3 rotates the exhaust turbine by the exhaust pressure of the exhaust passage 10, rotates the intake compressor on the same shaft, and supercharges the intake air of the intake passage 3. The intake air is cooled by an intercooler 4, and the supercharged intake air is aspirated into the combustion chamber of each cylinder via an intake throttle 5 and collector 6.

The diesel engine 1 also supplies fuel to each cylinder by a common rail type fuel supply system. The fuel supply system is provided with a high pressure fuel supply pump 7 which pressurizes fuel, a common rail 8 which stores the pressurized fuel, and a fuel injector 9 which injects the stored fuel of the common rail into each cylinder.

In each cylinder, the air-fuel mixture of the aspirated air and the fuel injected from the fuel injector 9 is burned by compression ignition, and the diesel engine 1 is rotated by combustion energy. The combustion gas generated as a result of the combustion of the air-fuel mixture is discharged as exhaust gas to the outside of the combustion chamber via the exhaust passage 10. Part of the exhaust gas of the exhaust passage 10 returns to the intake collector 6 via an exhaust gas recirculation passage (EGR passage) 11. The EGR passage 11 is provided with an exhaust gas recirculation valve (EGR valve) 12 which adjusts the exhaust gas recirculation flowrate (EGR flowrate).

The remaining exhaust gas drives the exhaust gas turbine of the variable nozzle turbocharger 3, and after harmful constituents have been removed by the exhaust emission control device, it is discharged to the atmosphere.

The exhaust emission control device is provided with a nitrogen oxides (NOx) trap catalyst 13 and diesel particulate filter (DPF) 14 which are arranged in series with the exhaust passage 2.

The NOx trap catalyst 13 is a catalyst known in the art which traps the NOx in the exhaust gas when the oxygen concentration of the exhaust gas corresponds to a lean air-fuel ratio, and discharges and reduces trapped NOx when the oxygen concentration of the exhaust gas corresponds to a rich air-fuel ratio. The NOx trap catalyst 13 supports a precious metal as the catalyst. The catalyst precious metal has an oxidative catalyst function which oxidizes hydrocarbons (HC) and carbon monoxide (CO) in the exhaust gas.

The NOx trap catalyst 13 traps NOx and SOx.

The DPF 14 traps particulate matter in the exhaust gas in a low temperature environment and, when the temperature rises to a predetermined regeneration temperature, regenerates by burning the trapped particulate matter. An oxidation catalyst which oxidizes HC and CO is also supported in the DPF 14.

It is also possible to reverse the order of the NOx trap catalyst 13 and the DPF 14 in the exhaust passage 10. Alternatively, it is possible to support the NOx trap catalyst in the DPF 14.

The exhaust gas purification control device comprises a controller 20 for controlling the fuel injection amount and the injection timing of the fuel injector 9, the opening of an intake throttle 5 and the opening of the EGR valve 12 so that the exhaust gas purification functions of the NOx trap catalyst 13 and the DPF 14 work correctly.

The controller 20 comprises a microcomputer provided with a central processing unit (CPU), read-only memory (ROM), random access memory (RAM) and input//output interface (I/O interface). The controller 20 may also comprise plural microcomputers.

For the aforesaid control, detection data are inputted as signals respectively to the controller 20 from a rotation speed sensor 21 which detects an engine rotation speed Ne, an accelerator opening sensor 22 which detects an opening APO of an accelerator pedal with which the vehicle is provided, a catalyst temperature sensor 23 which detects a catalyst temperature of the NOx trap catalyst 13, an exhaust gas pressure sensor 24 which detects an exhaust gas pressure of the exhaust passage 10 at the inlet of the DPF 14, a DPF temperature sensor 25 which detects a temperature of the DPF 14, and a universal exhaust gas oxygen sensor 26 which detects an excess air factor λ of the air-fuel mixture which has burnt in the diesel engine 1 from the oxygen concentration of the exhaust gas at the outlet of the DPF 14. The excess air-fuel factor λ is the ratio of the air-fuel ratio of the air-fuel mixture to the stoichiometric air-fuel ratio.

When the air-fuel ratio of the air-fuel mixture is equal to the stoichiometric air-fuel ratio, the excess air factor λ is 1, when the air-fuel ratio of the air-fuel mixture is lean, the excess air factor λ takes a larger value than 1, and when the air-fuel ratio of the air-fuel mixture is rich, the excess air factor λ takes a value smaller than 1.

An exhaust gas temperature sensor may be installed in the exhaust passage 10 downstream of each device without directly detecting the temperature of the NOx trap catalyst 13 and the temperature of the DPF 14, so that the temperature of the NOx trap catalyst 13 and temperature of the DPF 14 are detected indirectly from the exhaust gas temperature.

Based on input signals from the sensors, the controller 21 controls the fuel injection amount and injection timing of the fuel injector 9, the opening of the intake throttle 5 and the opening of the EGR valve 12 via signals output to each device so that the exhaust gas purification function of the NOx trap catalyst 13 and DPF 14 work correctly. More specifically, the regeneration of the DPF 14, regeneration of the NOx trap catalyst 13 and the desulfating of the NOx trap catalyst 13 are performed appropriately via these controls so that there are no mutually adverse effects.

FIGS. 2A-2K show the routine performed by the controller 21 to realize the above control. The controller 21 continuously repeats this routine during running of the diesel engine 1. After the routine reaches END in one process of FIGS. 2A-2K, execution of the routine is resumed from START of FIG. 2A.

Figure 2A:
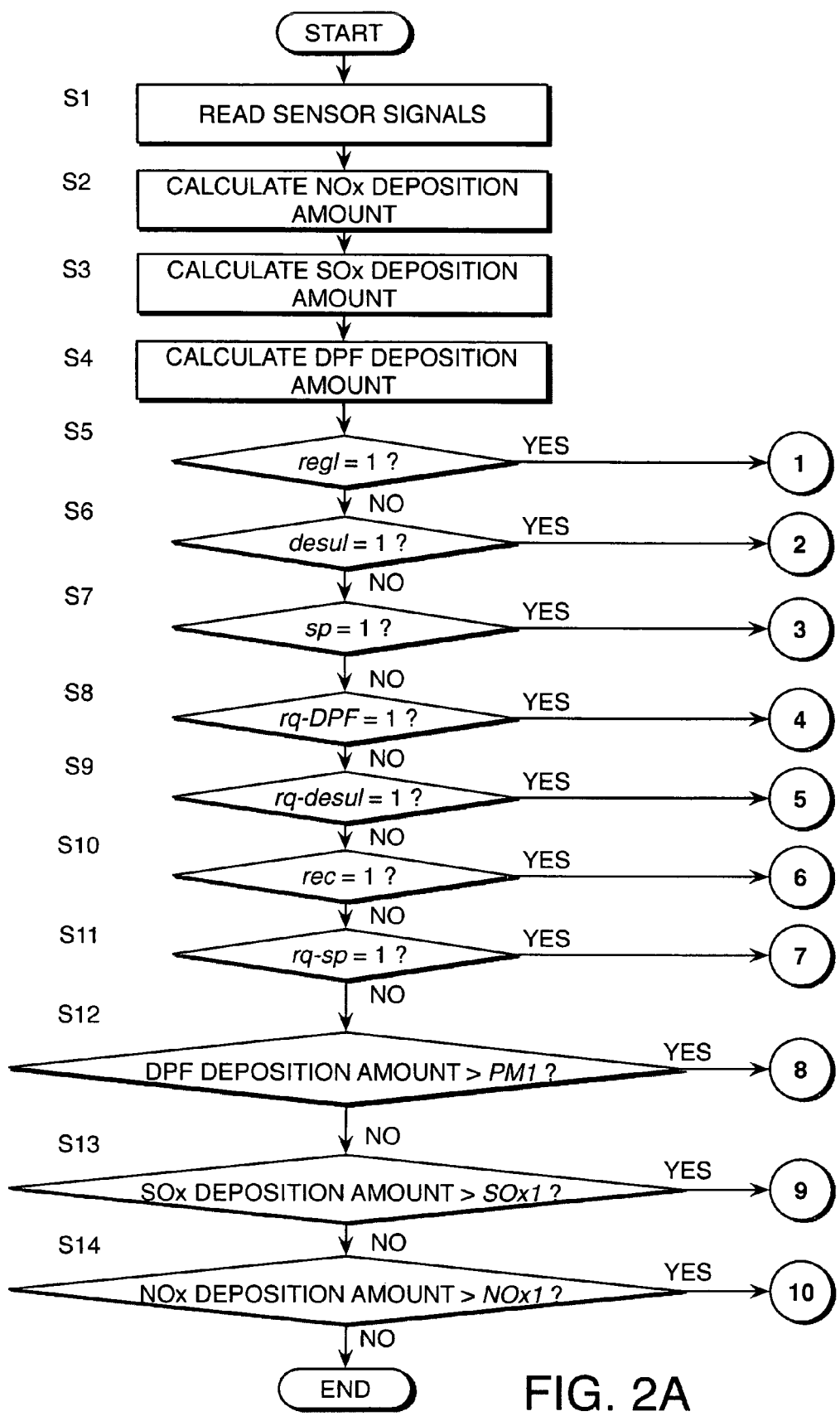
FIGS. 2A-2K are flow charts describing an exhaust gas purification control routine performed by a controller of this invention.

Referring to FIG. 2A, the controller 21, in a step S1, reads the engine speed Ne, the accelerator opening APO, the temperature of the NOx catalyst 13, the exhaust gas pressure at the inlet of the DPF 14, the DPF temperature and the excess air factor λ detected from the oxygen concentration of the DPF outlet, respectively from the signals inputted by the aforesaid sensors. Further, a fuel injection amount Q is determined by looking up a map known in the art taking the engine speed Ne and accelerator opening APO as parameters.

In a step S2, the controller 21 calculates a NOx deposition amount of the NOx trap catalyst 13. This calculation is performed by applying the method of calculating the NOx deposition amount disclosed on page 6 of Japanese Patent No. 2699402. Alternatively, the NOx deposition amount of the NOx trap catalyst 13 can be estimated based on the integrated value of the engine speed Ne or on the vehicle travel distance, after a NOx trap catalyst regeneration request flag rq–sp described below is reset.

In a step S3, the controller 21 calculates a SOx deposition amount due to sulfur poisoning of the NOx trap catalyst 13. Specifically, this is calculated based on the vehicle travel distance, the fuel consumption amount or the cumulative running time of the diesel engine 1, after performing desulfating. In any case, a corresponding counter is set when desulfating is performed.

In a step S4, the controller 21 calculates a particulate matter deposition amount of the DPF 14. This calculation is performed based on the exhaust gas pressure detected by the exhaust gas pressure sensor 24 at the inlet of the DPF 14. As particulate matter builds up on the DPF 14, the exhaust gas flow resistance of the DPF 14 increases and the exhaust pressure at the inlet of the DPF 14 increases. A standard exhaust gas pressure is first calculated according to the engine speed Ne and the fuel injection amount Q, and the particulate matter deposition amount of the DPF 14 is calculated by comparing the standard exhaust gas pressure and the measured exhaust gas pressure. The particulate matter deposition amount can also be calculated by combining the integral of the engine rotation speed Ne or the cumulative vehicle travel distance, after regeneration of the DPF 14 is performed, with the exhaust gas pressure.

This invention does not depend on the method of calculation performed in the steps S2-S4, and any method known in the art may be applied to the calculation of the steps S2-S4.

Figure 2B:
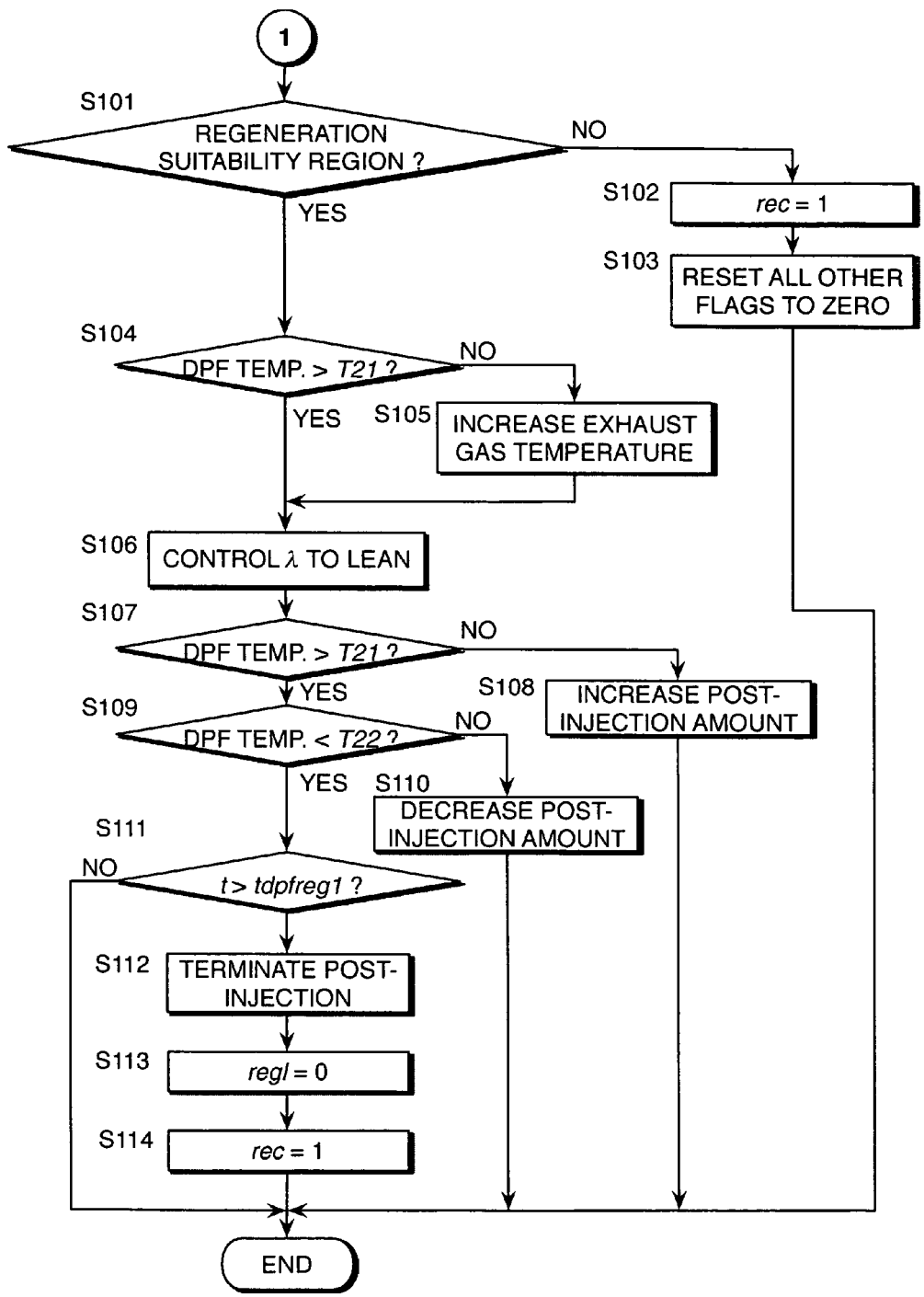

In a step S5, the controller 21 determines whether or not a DPF regeneration command flag regl is unity. Here, regl=1 shows that regeneration of the DPF 14 has been commanded, and regl=0 shows that regeneration of the DPF 14 has not been commanded. When the determination is affirmative, the controller 21 performs the DPF regeneration process of DPF 14 shown in steps S101-S111 of FIG. 2B shown below.

When the determination of the step S5 is negative, the controller 21, in a step S6, determines whether or not a desulfating command flag desul of the NOx trap catalyst 13 is unity. Here, desul=1 shows that desulfating has been commanded, and desul=0 shows that desulfating has not been commanded. When the determination is affirmative, the controller 21 performs the desulfating process of the NOx trap catalyst 13 shown in steps S201-S212 of FIG. 2C described below.

When the determination of the step S6 is negative, the controller 21, in a step S7, determines whether or not a NOx trap catalyst regeneration command flag sp of the NOx trap catalyst 13 is unity. Here, sp=1 shows that regeneration of the NOx trap catalyst 13 has been commanded, and sp=0 shows that regeneration of the NOx trap catalyst has not been commanded. When the determination is affirmative, the controller 21 performs the NOx trap catalyst regeneration process shown in steps S301-S306 of FIG. 2D described below.

When the determination of the step S7 is negative, the controller 21, in a step S8, determines whether or not a DPF regeneration request flag rq–DPF which shows a regeneration request of the DPF 14, is unity. Here, rq–DPF=1 shows that there is a regeneration request, and rq–DPF=0 shows that there is no regeneration request.

When the determination is affirmative, the controller 21 performs a first regeneration priority determination process shown in steps S401-S411 of FIG. 2E described below.

When the determination of the step S8 is negative, the controller 21, in a step S9, determines whether or not a desulfating request flag rq–desul is unity.

Here, rq–desul=1 shows that there is a desulfating request, and rq–desul=0 shows that there is no desulfating request. When the determination is affirmative, the controller 21 performs a second regeneration priority determination process shown in steps S501-S509 of FIG. 2F described below.

When the determination of the step S9 is negative, the controller 21, in a step S10, determines whether or not a heat deterioration prevention mode flag rec, which shows a heat deterioration prevention mode after regeneration of the DPF 14 or desulfating of the NOx trap catalyst 13, is unity. The heat deterioration prevention mode relates to the state where, as a result of performing regeneration of the DPF 14 or desulfating of the NOx trap catalyst 13, the exhaust gas temperature rises and the DPF 14 is in a high temperature state.

In this state, there is a possibility that the residue in the DPF 14 or particulate matter deposited on the DPF 14 may burn all at once which would cause heat deterioration of the DPF 14. Therefore, the controller 21 performs processing to reduce the oxygen concentration of the exhaust gas to a predetermined temperature. The state which requires this processing is referred to as the heat deterioration prevention mode.

Figure 2C:
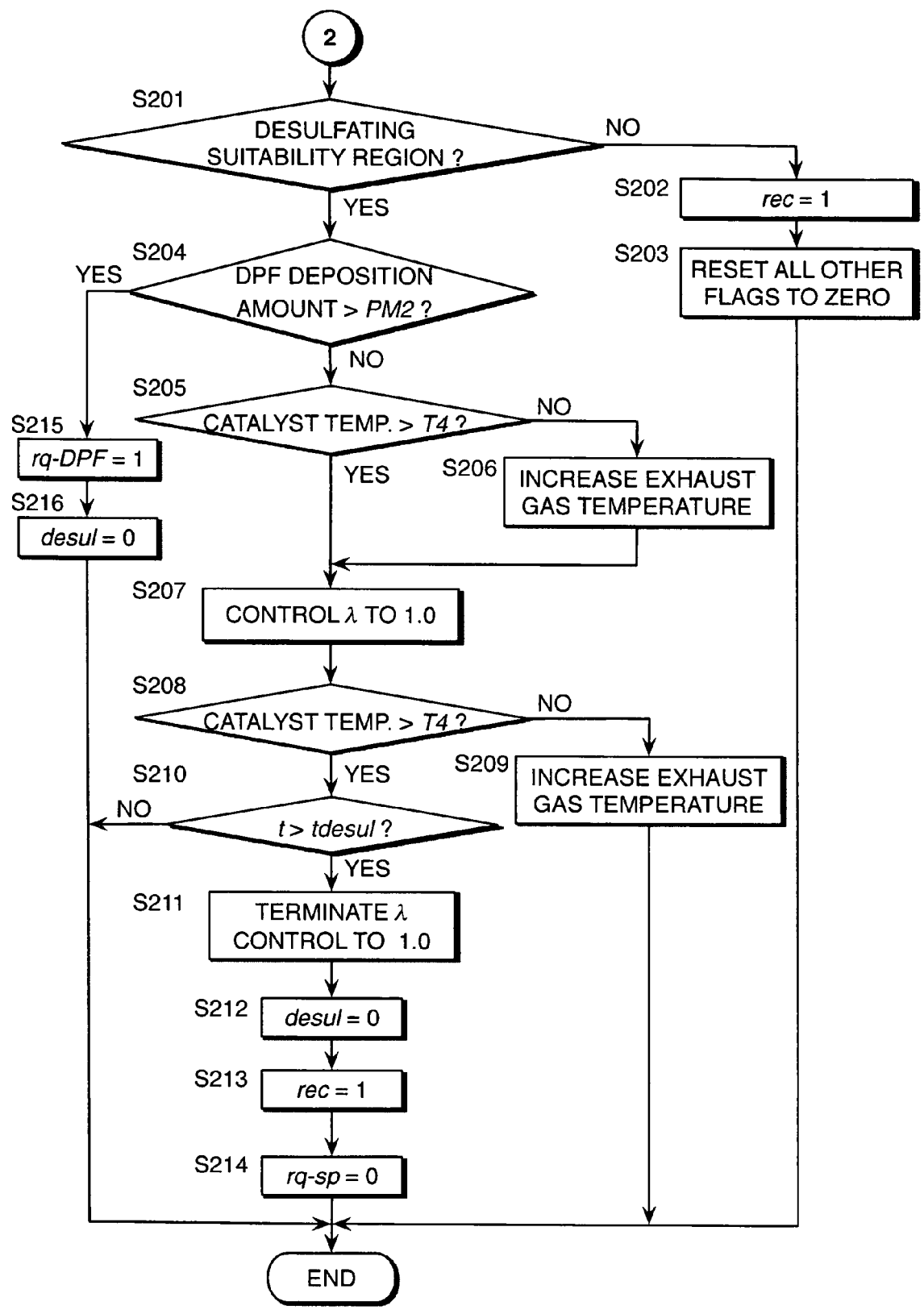

When the determination of the step S10 is affirmative, the controller 21 performs the heat deterioration prevention process shown in steps S601-S604 of FIG. 2G described below.

When the determination of the step S10 is negative, the controller 21, in a step S11, determines whether or not a NOx trap catalyst regeneration request flag rq–sp which shows a regeneration request of the NOx trap catalyst 13, is unity. When rq–sp=1, it shows that there is a regeneration request, and when rq–sp=0, it shows that there is no regeneration request.

Figure 2D:
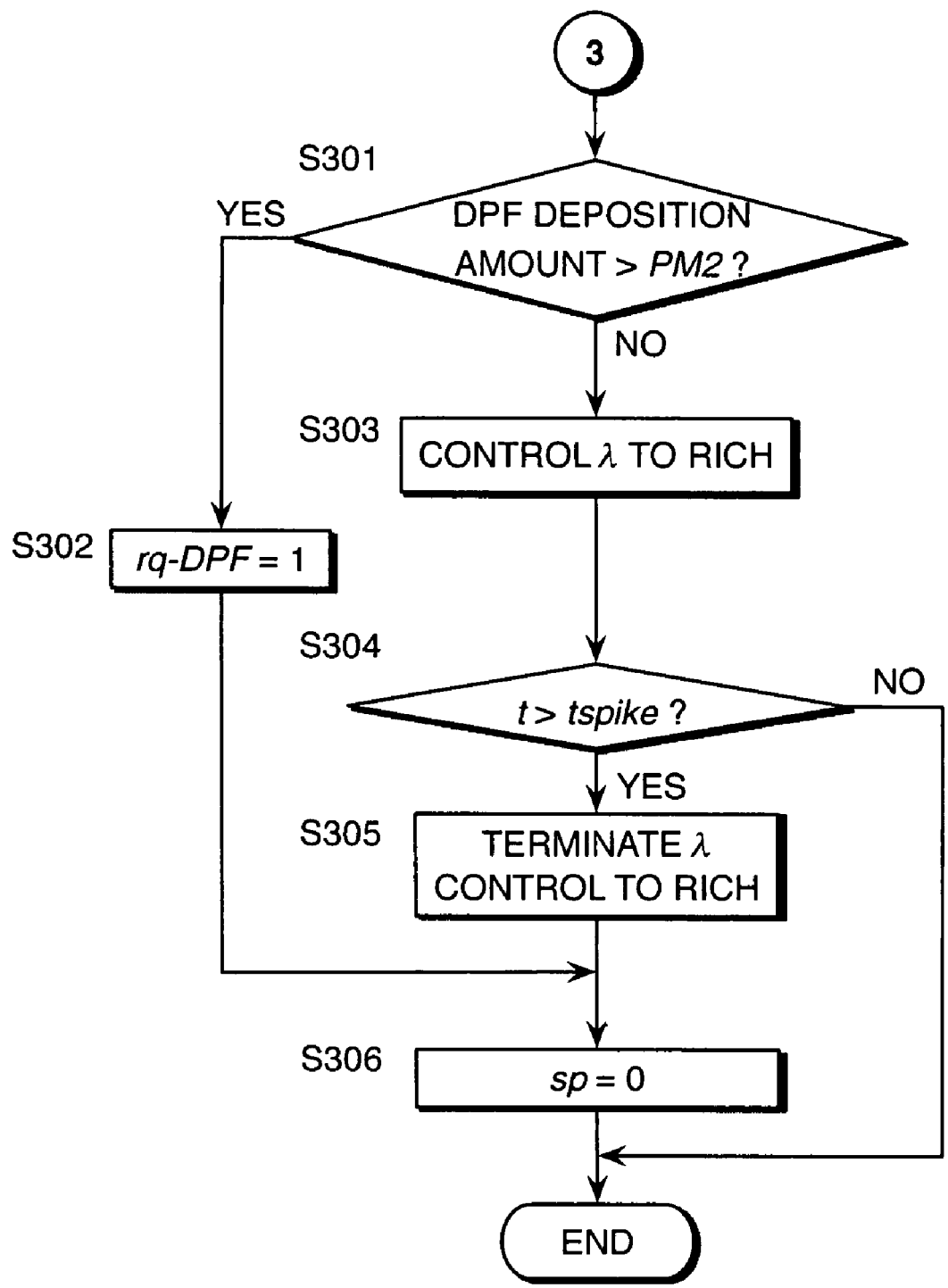
Figure 2E:
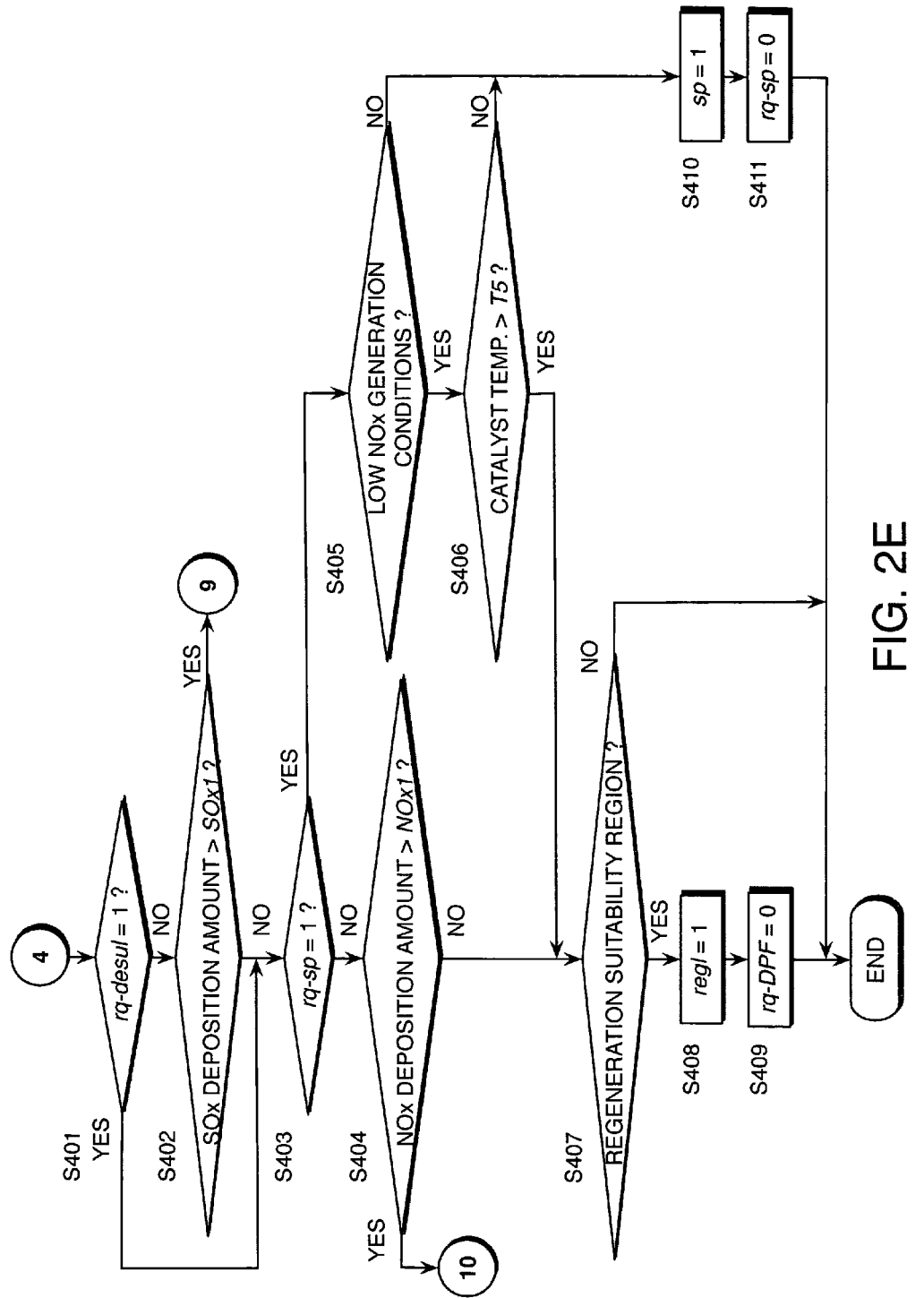
Figure 2F:
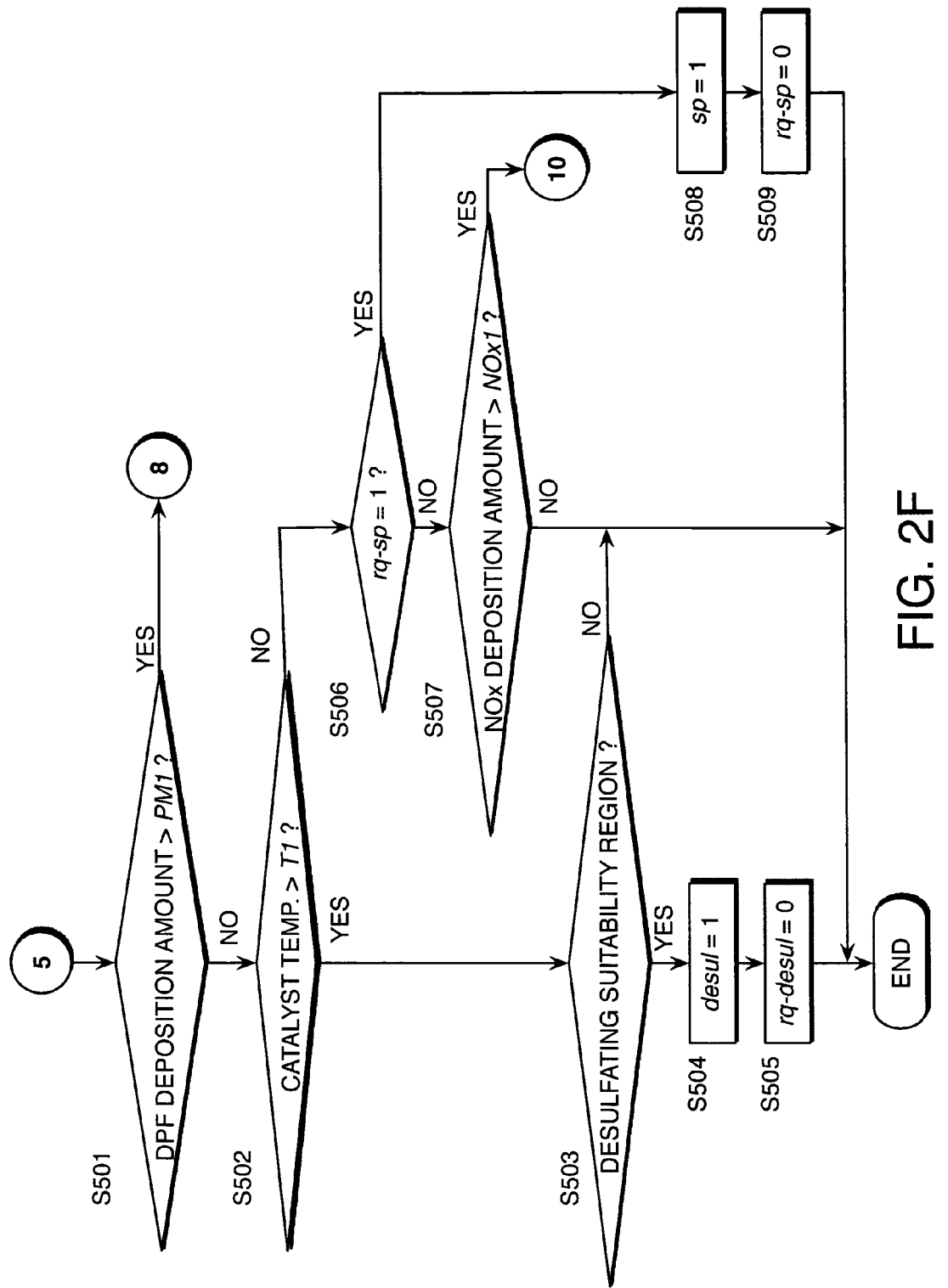
Figure 2G:
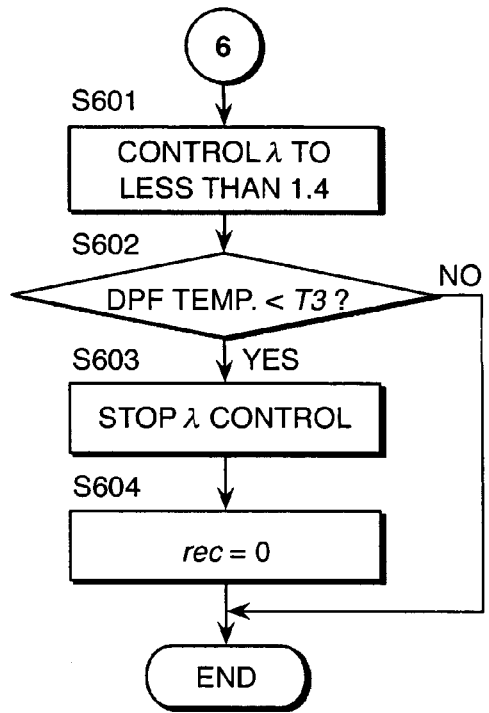
Figure 2I:
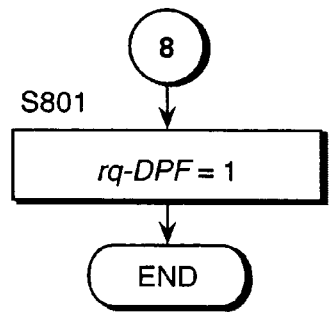
Figure 2J:
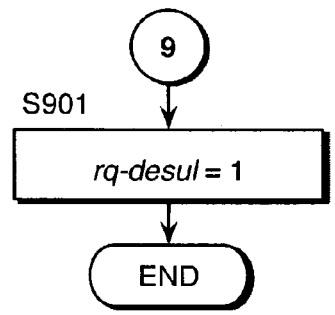
Figure 2H:
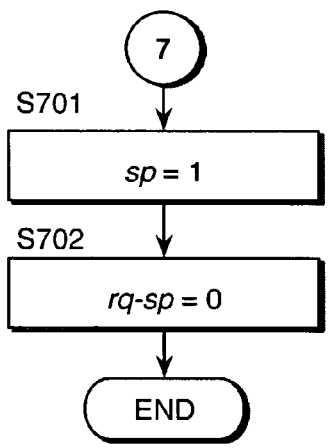

When the determination is affirmative, the controller 21 sets the NOx trap catalyst regeneration command flag sp to unity in a step S701 of FIG. 2H, and resets the NOx trap catalyst regeneration request flag rq–sp to zero in a step S702. After the processing of the step S702, the controller 21 terminates the routine.

When the determination of the step S11 is negative, the controller 21, in a step S12, compares the particulate matter deposition amount of the DPF 14 calculated in the step S4 with a predetermined amount PM1. The predetermined amount PM1 is the particulate matter deposition amount for determining whether or not to regenerate the DPF 14. The predetermined amount PM1 may be 6-10 grams per liter of the DPF 14.

Figure 3:
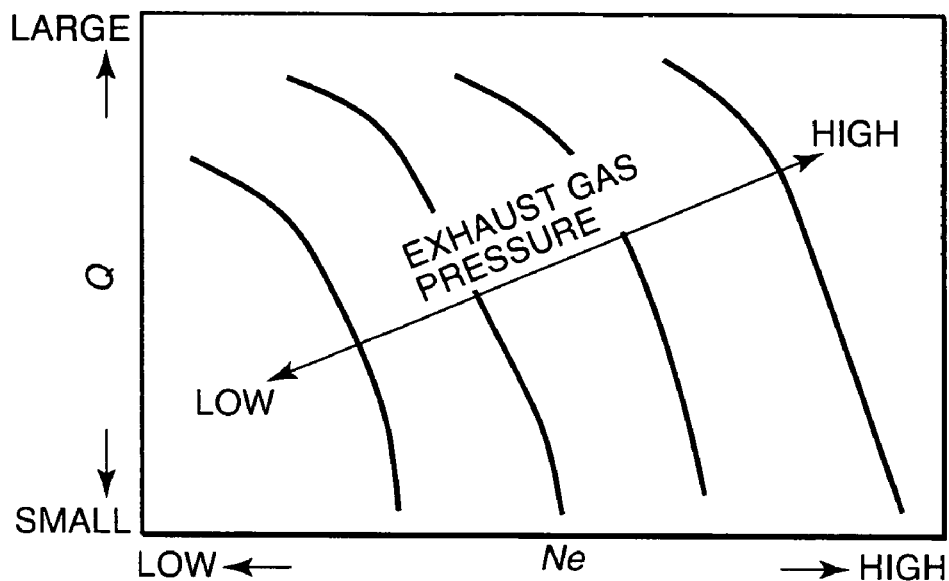
FIG. 3 is a diagram describing the characteristics of a map of an exhaust gas pressure threshold of a DPF stored by the controller.

Here, the alternatives in this determination will be described referring to FIG. 3. Specifically, a map of the characteristics of exhaust gas pressure at the inlet of the DPF 14 when the particulate matter deposition amount has reached the predetermined amount PM1 under various running conditions, is generated beforehand with the engine speed Ne and fuel injection amount Q as parameters. When the exhaust gas pressure detected by the exhaust pressure sensor 24 exceeds the exhaust gas pressure read from the map based on the engine speed Ne and the fuel injection amount Q at the determination time, the controller 21 determines that the particulate matter deposition amount of the DPF 14 has exceeded the predetermined amount PM1.

When the determination of the step S12 is affirmative, the controller 21, in a step S801 of FIG. 2I, sets the DPF regeneration request flag rq–DPF to unity. After the processing of the step S801, the controller 21 terminates the routine.

When the determination of the step S12 is negative, the controller 21, in a step S13, compares a SOx deposition amount due to sulfur poisoning of the NOx trap catalyst 13 calculated in the step S3 with a predetermined amount SOx1. The predetermined amount SOx1 is the SOx deposition amount for determining whether or not to perform desulfating of the NOx trap catalyst 13.

The predetermined amount SOx1 may for, example be the SOx deposition amount which reduces the NOx trap capability of the NOx trap catalyst 13 to 80%. The actual value of the predetermined amount SOx1 is determined by experiment.

When the determination of the step S13 is affirmative, the controller 21, in a step S901 of FIG. 2J, sets a desulfating request flag rq–desul to unity. After the processing of the step S901, the controller 21 terminates the routine.

When the determination of the step S13 is negative, the controller 21, in a step S14, compares the NOx deposition amount of the NOx trap catalyst 13 calculated in the step S2 with a predetermined amount NOx1. The predetermined amount NOx1 is the NOx deposition amount for determining whether or not to regenerate the NOx trap catalyst 13. Here, the predetermined amount NOx1 is 0.2 grams per liter of the NOx trap catalyst 13.

Figure 2K:
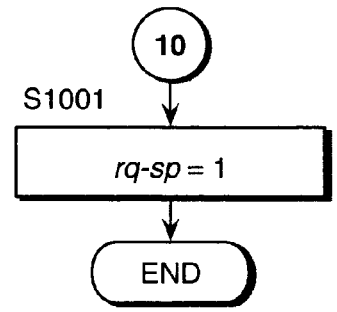

When the determination of the step S14 is affirmative, the controller 21, in a step S1001 of FIG. 2K, sets a NOx trap catalyst regeneration request flag rq–sp to unity. After the processing of the step S1001, the controller 21 terminates the routine.

When the determination of the step S14 is negative, regeneration of the DPF 14, regeneration of the NOx trap catalyst 13 and desulfating of the NOx trap catalyst 13 are not performed, and their execution is not requested. In this case, the controller 21 terminates the routine without performing any control.

Next, the DPF regeneration process of PF14 will be described referring to FIG. 2B.

Figure 9:
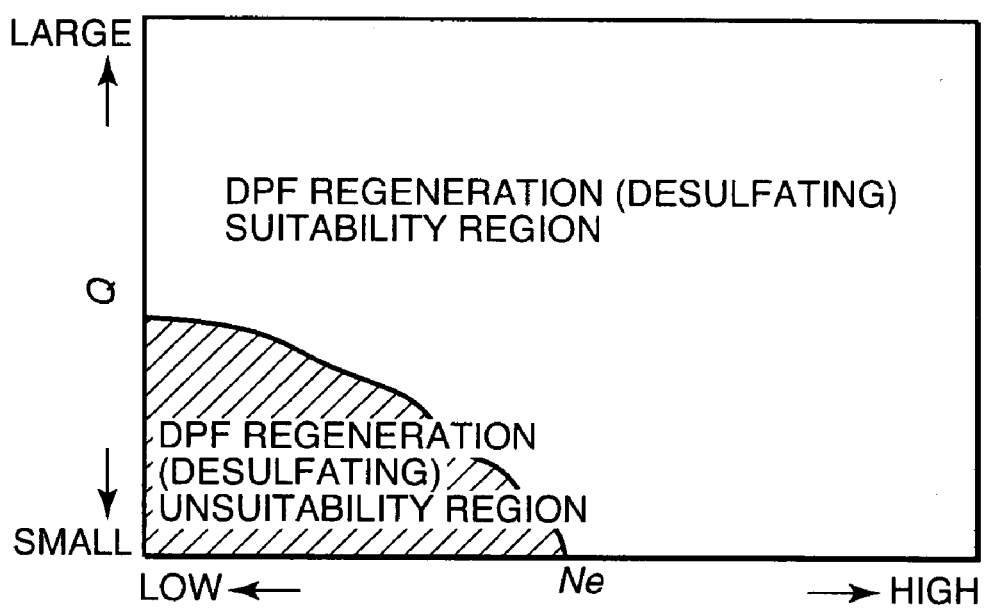
FIG. 9 is a diagram describing the characteristics of a map of a feasible DPF regeneration and SOx removal area stored by the controller.

The controller 21, in the step S101, determines the running conditions of the diesel engine 1, i.e., it determines whether or not the running conditions are suitable for regeneration of the DPF 14 by looking up a map having the characteristics shown in FIG. 9 stored beforehand in the internal memory (ROM) from the fuel injection amount Q and the rotation speed Ne of the diesel engine 1.

When the determination is negative, i.e., when the running conditions of the diesel engine 1 are unsuitable for regeneration of the DPF 14, after the controller 21 sets the heat deterioration prevention mode flag rec to unity in the step S102 and resets all other flags to zero in the step S103, it terminates the routine.

When the determination is affirmative, the controller 21 determines, in the step S104, whether or not the temperature of the DPF 14 detected by the DPF temperature sensor 25 in the step S1, has exceeded a predetermined temperature T21. The predetermined temperature T21 is the temperature required for combustion of particulate matter. The predetermined temperature T21 is 500 to 600 degrees Centigrade.

When the determination of the step S104 is negative, the controller 21, in the step S105, performs a temperature increase operation of the DPF 14. Specifically, the opening of the intake throttle 5 is decreased. The temperature increase operation is continuously performed until the temperature of the DPF 14 exceeds the predetermined temperature T21.

Figure 4:
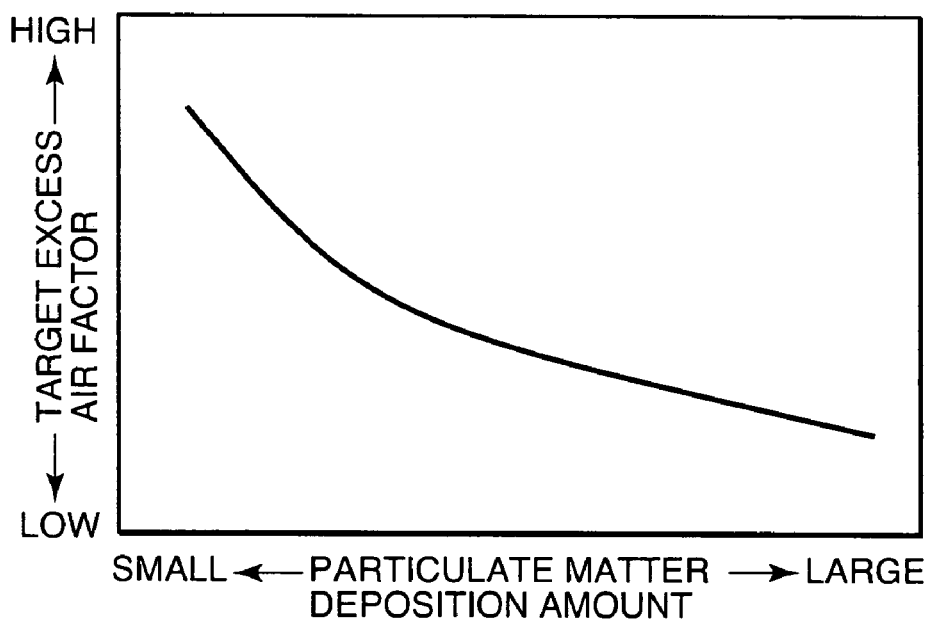
FIG. 4 is a diagram describing the characteristics of a map of a target excess air factor in DPF regeneration stored by the controller.

When, due to the determination of the step S104 being affirmative or due to the temperature increase operation of the step S105, the temperature of the DPF 14 exceeds the predetermined temperature T21, the controller 21, in the step S106, makes the air-fuel ratio of the air-fuel mixture lean. In this control, the controller 21 calculates a target excess air factor from the particulate matter deposition amount by looking up a map having the characteristics shown in FIG. 4 stored beforehand in the memory (ROM). Referring to FIG. 4, the target excess air factor of DPF 14 decreases as the particulate matter deposition amount increases. The propagation rate of combustion of particulate matter during regeneration of the DPF 14 is higher and heat deterioration of the DPF 14 occurs more easily, the larger the particulate matter deposition amount is. Hence, the target excess air factor is set to be smaller, the larger the particulate matter deposition amount is, so that the temperature of the DPF 14 does not rise excessively.

Figure 5:
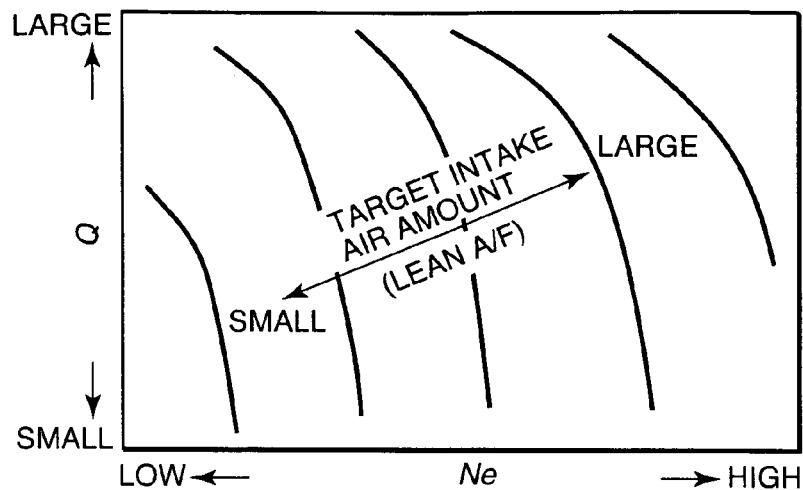
FIG. 5 is a diagram describing the characteristics of a map of a target intake air amount for DPF heat deterioration prevention stored by the controller.

As shown in FIG. 5, a map which defines the target intake air amount according to the fuel injection amount Q and the engine speed Ne is stored in the memory (ROM) of the controller 21 for each target excess air factor. The controller 21 selects the map corresponding to the calculated target excess air factor, and calculates a target intake air amount from the fuel injection amount Q and the engine speed Ne at that time. Also, the opening of the intake throttle 5 is adjusted so that the calculated target intake air amount may be realized. Preferably, feedback control of the opening of the intake throttle 5 is performed so that the excess air factor λ detected by the universal exhaust gas oxygen concentration sensor 26 coincides with the target excess air factor.

In a following step S104, the controller 21 detects the latest temperature of the DPF 14 by the input signal from the DPF temperature sensor 25, and compares it with the predetermined temperature T21. If the latest temperature of the DPF 14 does not exceed the predetermined temperature T21, the controller 21 performs the processing of the step S108.

Figure 6:
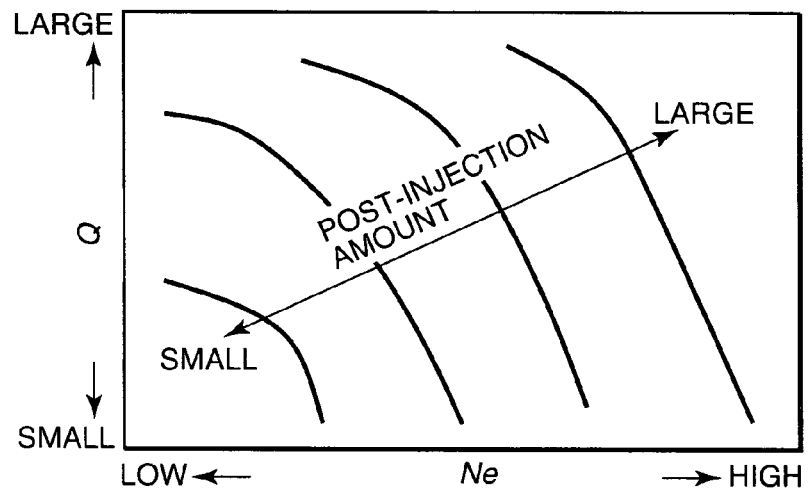
FIG. 6 is a diagram describing the characteristics of a map of a unit post-injection amount for temperature increase stored by the controller.

In the step S108, the controller 21 makes the fuel injector 9 perform a post-injection. A post-injection is an additional fuel injection which is performed after fuel injection of the fuel injection amount a for combustion, and has the role of increasing exhaust gas temperature. After the processing of the step S108, the controller 21 terminates the routine. The controller 21 determines the post injection amount from the fuel injection amount Q and the engine speed Ne by looking up a map having the characteristics shown in FIG. 6 stored beforehand in the memory (ROM). If the post-injection has already been performed, the post-injection amount is increased by a fixed amount. The controller 21 controls the fuel injector 9 so that a fuel injection equivalent to the determined post-injection amount is performed.

The processing of the step S106 is performed only when the temperature of the DPF 14 exceeds the predetermined temperature T21, but the temperature of the DPF 14 may fall as a result of adjusting the opening of the intake throttle 5 in the step S106. Even if the intake throttle 5 is reduced in the step S105 to raise the temperature of the DPF 14, the temperature of the DPF 14 may fall due to the operation of the intake throttle 5 to realize a lean air-fuel ratio in the step S106.

The processing of the steps S107, S108 results in increasing the temperature of the DPF 14 which has fallen below the predetermined temperature T21 as a result of the processing of the step S106. The processing of the step S108 is continuously performed until the temperature of the DPF 14 exceeds the predetermined temperature T21. When the temperature of the DPF 14 exceeds the predetermined temperature T21, the controller 21 terminates the routine.

When the routine is complete, the controller 21 immediately resumes execution of the next routine from the step S1 of FIG. 2A. Therefore, when the processing of the step S108 is performed, during execution of the next routine, the probability that the determination of the step S107 will change to affirmative is high.

When the temperature of the DPF 14 exceeds the predetermined temperature T21 in the step S107, the controller 21 compares the latest temperature of the DPF 14 with a maximum temperature T22 during DPF regeneration in the step S106. The maximum temperature T22 is set to 700 to 800 degrees Centigrade. If the temperature is equal to or greater than the latest maximum temperature T22 of the DPF 14, the controller 21, in the step S110, decreases the post-injection amount of the fuel injector 9 by a fixed amount. If the post-injection amount is already a minimum, post-injection is stopped. This processing is continuously performed until the temperature of the DPF 14 is less than the maximum temperature T22. If the temperature of the DPF 14 is less than the maximum temperature T22, the controller 22 terminates the routine. When the routine is complete, the controller 21 immediately resumes execution of the next routine from the step S1 of FIG. 2A. Therefore, when the processing of the step S110 is performed, during execution of the next routine, the probability that the determination of the step S109 changes to affirmative is high.

In the step S109, when the temperature of the DPF 14 is less than the maximum temperature T22, the controller 21, in the step S108, compares a continuation time t in the state where the temperature of the DPF 14 is in a regeneration temperature region between the predetermined temperature T21 and the maximum temperature T22, with a predetermined time tdpfregl. The predetermined time tdpfregl is 5 to 10 minutes. When the continuation time t is less than the predetermined time tdpfregl, the controller 21 terminates the routine. When the routine is terminated, the controller 21 immediately resumes execution of the next routine from the step S1 of FIG. 2A. If the temperature of the DPF 14 remains in the regeneration temperature region between the predetermined temperature T21 and the maximum temperature T22, the continuation time t accumulates due to repeated execution of the routine.

Hence, if the continuation time t exceeds the predetermined time tdpfregl in the step S111, the controller 21 performs termination processing of the DPF regeneration process in steps S112-S114. Specifically, the controller 21 stops post-injection in the step S112, resets the DPF regeneration command flag regl to zero in the step S113, sets the heat deterioration prevention mode flag rec to unity in the step S114, and terminates the routine.

Next, referring to FIG. 2C, the desulfating process of the NOx trap catalyst 13 will be described.

The controller 21, in the step S201, determines the running conditions of the diesel engine 1, i.e., determines whether or not the running conditions are suitable for desulfating of the NOx trap catalyst 13 by looking up a map having the characteristics shown in FIG. 9 stored beforehand in the internal memory (ROM) from the fuel injection amount Q and the rotation speed Ne of the diesel engine 1. It should be noted that although the map used for this determination and the map used for the determination of the step 101 as to whether or not the running conditions are suitable for regeneration of the DPF 14 are identical in this embodiment, different maps having different characteristics may be used in these determinations.

When the determination of the step S201 is negative, i.e., when the running conditions of the diesel engine 1 are unsuitable for desulfating of the NOx trap catalyst 13, the controller 21 sets the heat deterioration prevention mode flag rec to unity in the step S202, resets all other flags to zero in the step S203, and terminates the routine.

When the determination of the step S201 is affirmative, the controller 21 determines whether or not the particulate matter deposition amount exceeds a predetermined amount PM2 in the step S204. Here, the predetermined amount PM2 is a value larger than or equal to the predetermined amount PM1 used in the step S12. Here, the predetermined amount PM2 is set to 10 grams or more per liter of the DPF 14.

When the particulate matter deposition amount exceeds the amount PM2, the controller 21 sets the DPF regeneration request flag rq–DPF to unity in the step S215, resets the desulfating command flag desul to zero in the step S216, and terminates the routine. If the particulate matter deposition amount exceeds the predetermined amount PM2, when starting the desulfating process of the NOx trap catalyst 13, the processing of the steps S204, S215, S216 signifies regeneration of the DPF 14 before performing the desulfating process.

Now, when the particulate matter deposition amount does not exceed the predetermined amount PM2 in the step S204, the controller 21, in the step S205, determines whether or not the catalyst temperature of the NOx trap catalyst 13 detected by the catalyst temperature sensor 23 exceeds a predetermined temperature T4. This predetermined temperature is a threshold for determining whether or not the NOx trap catalyst 13 has reached a temperature suitable for desulfating. Here, the predetermined temperature T4 is set to 600 degrees Centigrade.

In a barium type NOx trap catalyst, to perform desulfating, the temperature must be set equal to or higher than 600 degrees Centigrade while maintaining the air-fuel ratio from a stoichiometric air-fuel ratio to a rich air-fuel ratio. Here, therefore, the predetermined temperature T4 is set to 600 degree Centigrade.

When the catalyst temperature does not exceed the predetermined temperature T4, the controller 21 performs temperature increase operation of the NOx trap catalyst 13 in a step S206. Specifically, the opening of the intake throttle 5 is decreased. The temperature increase operation is continuously performed until the temperature of the DPF 14 exceeds the predetermined temperature T4.

When, due to the determination of the step S205 being affirmative, or due to the temperature increase operation of the step S206, the NOx trap catalyst 13 exceeds the predetermined temperature T4, the controller 21, in the step S207, controls the excess air factor $\lambda$ of the air-fuel mixture to 1.0 corresponding to the stoichiometric air-fuel ratio. In this control, the controller 21 calculates a target intake air amount corresponding to the stoichiometric air-fuel ratio based on the engine speed Ne and the fuel injection amount a by looking up a map having the characteristics shown in FIG. 7 stored beforehand in the memory (ROM).

Figure 7:
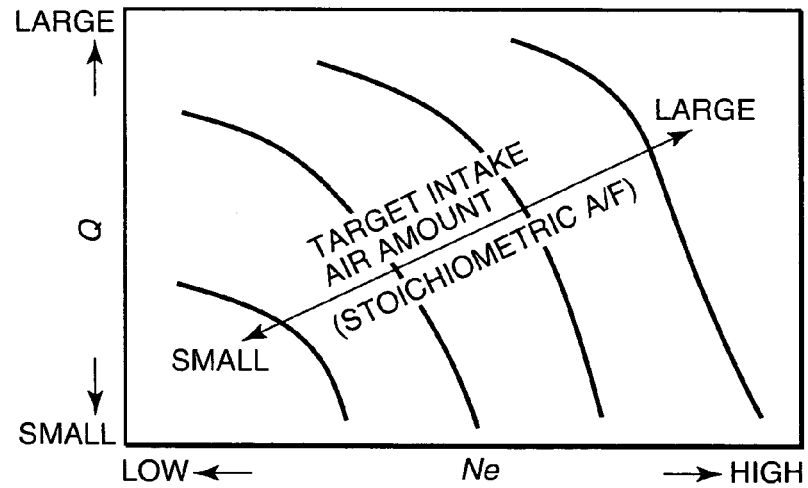
FIG. 7 is a diagram describing the characteristics of a map of a target intake air volume for running under the stoichiometric air-fuel ratio stored by the controller.

Referring to FIG. 7, the target intake air amount takes a larger value, the higher the engine speed Ne is and the larger the fuel injection amount Q is. The controller 21 adjusts the opening of the intake throttle 5 so that the calculated target intake air amount may be realized. Preferably, feedback control of the opening of the intake throttle 5 is performed so that the excess air factor $\lambda$ detected by the universal exhaust gas oxygen concentration sensor 26 coincides with 1.0 corresponding to the stoichiometric air-fuel ratio.

Here, desulfating of the NOx trap catalyst 13 discharges SOx from the NOx trap catalyst 13 in a high temperature environment, and is not accompanied by a chemical change. Therefore, the excess air factor λ does not need to be exactly 1.0, and may be a value in the vicinity of 1.0.

In a following step S208, the controller 21 detects the latest temperature of the NOx trap catalyst 13 by the input signal from the catalyst temperature sensor 23, and compares it with the predetermined temperature T4. If the latest temperature of the NOx trap catalyst 13 does not exceed the predetermined temperature T4, the controller 21 performs the processing of the step S209.

In the step S209, the controller 21 increases the exhaust gas temperature by performing a post-injection into the fuel injector 9, throttling the intake throttle 5 or delaying the fuel-injection timing. If the catalyst temperature of the NOx trap catalyst 13 falls due to control of the excess air factor λ of the step S207, this step S209 signifies increasing the exhaust gas temperature so that the lowered catalyst temperature again exceeds the predetermined temperature T4. In the case where a post-injection is performed, the controller 21 calculates the post-injection amount from the engine speed Ne and the fuel injection amount Q as in the step S108 by looking up the map having the characteristics shown in FIG. 6. The controller 21 controls the fuel injector 9 so that a fuel injection equivalent to the determined post-injection amount is performed.

The step S207 is performed only in the case where the catalyst temperature exceeds the predetermined temperature T4, but the catalyst temperature may be less than the predetermined temperature T4 as a result of adjusting the opening of the intake throttle 5 in order to realize the excess air factor λ of the stoichiometric air-fuel ratio in the step S207. The processing of the steps S208, S209 has the significance of restoring the catalyst temperature of the NOx trap catalyst 13 which fell to less than the predetermined temperature T4 as a result of the processing of the step S207. The processing of the step S209 is continuously performed until the catalyst temperature of the NOx trap catalyst 13 exceeds the predetermined temperature T4. When the catalyst temperature exceeds the predetermined temperature T4, the controller 21 terminates the routine. When the routine is terminated, the controller 21 immediately resumes execution of the next routine from the step S1 of FIG. 2A. Therefore, when the processing of the step S209 is performed, during execution of the next routine, the probability that the determination of the step S208 changes to affirmative is high.

When the catalyst temperature of the NOx trap catalyst 13 exceeds the predetermined temperature T4 in the step S208, the controller 21, in the step S210, compares the continuation time t in the state where the catalyst temperature exceeds the predetermined temperature T4, with a predetermined time tdesul. The predetermined time tdesul is set to 5 to 10 minutes. When the continuation time t is less than the predetermined time tdesul, the controller 21 terminates the routine. When the routine is terminated, the controller 21 immediately resumes execution of the next routine from the step S1 of FIG. 2A.

When the temperature of the NOx trap catalyst 13 is maintained in a desulfating temperature region exceeding the predetermined temperature T4, the continuation time t accumulates due to repetition of the routine.

Hence, in the step S210, if the continuation time t exceeds the predetermined time tdesul, the controller 21, in steps S211-S214, terminates the desulfating process of the NOx trap catalyst 13.

Specifically, the controller 21 stops control to the stoichiometric air-fuel ratio equivalent value 1.0 of the excess-air-factor λ in the step S211, and the desulfating command flag desul is reset to zero in the step S212, the heat deterioration prevention mode flag rec is set to unity in the step S213, the NOx trap catalyst regeneration request flag rq-sp is reset to zero in the step S214, and the routine is terminated. Due to these settings, on the next occasion the routine is executed, the determinations of the steps S5-S9 of FIG. 2A are negative, the determination of the step S11 is affirmative and a heat deterioration prevention process, described later, is performed.

The NOx trap catalyst regeneration request flag rq-sp is reset to zero in the step S214 because regeneration of the NOx trap catalyst 13 is simultaneously performed with the desulfating operation which maintains an excess air factor λ corresponding to the stoichiometric air-fuel ratio in the desulfating temperature region.

Next, referring to FIG. 2D, the regeneration process of the NOx trap catalyst 13 will be described. The processing of the steps S301, S302 is identical to the processing of the steps S204, S215 of FIG. 2C. When the particulate matter deposition amount of the DPF 14 exceeds the predetermined amount PM2 in the step S301, the DPF regeneration request flag rq-DPF is set to unity in the step S302, the NOx trap catalyst regeneration command flag sp is reset to zero in the step S306, and the routine is terminated. If, due to this process, the particulate matter deposition amount exceeds the predetermined amount PM2 when starting the regeneration process of the NOx trap catalyst 13, regeneration of the DPF 14 is performed before the regeneration process of the NOx trap catalyst 13.

The reason why priority is given to regeneration of the DPF 14 over regeneration of the NOx trap catalyst 13 or desulfating in the steps S204, S215 and steps S301, S302, is as follows.

Figure 10:
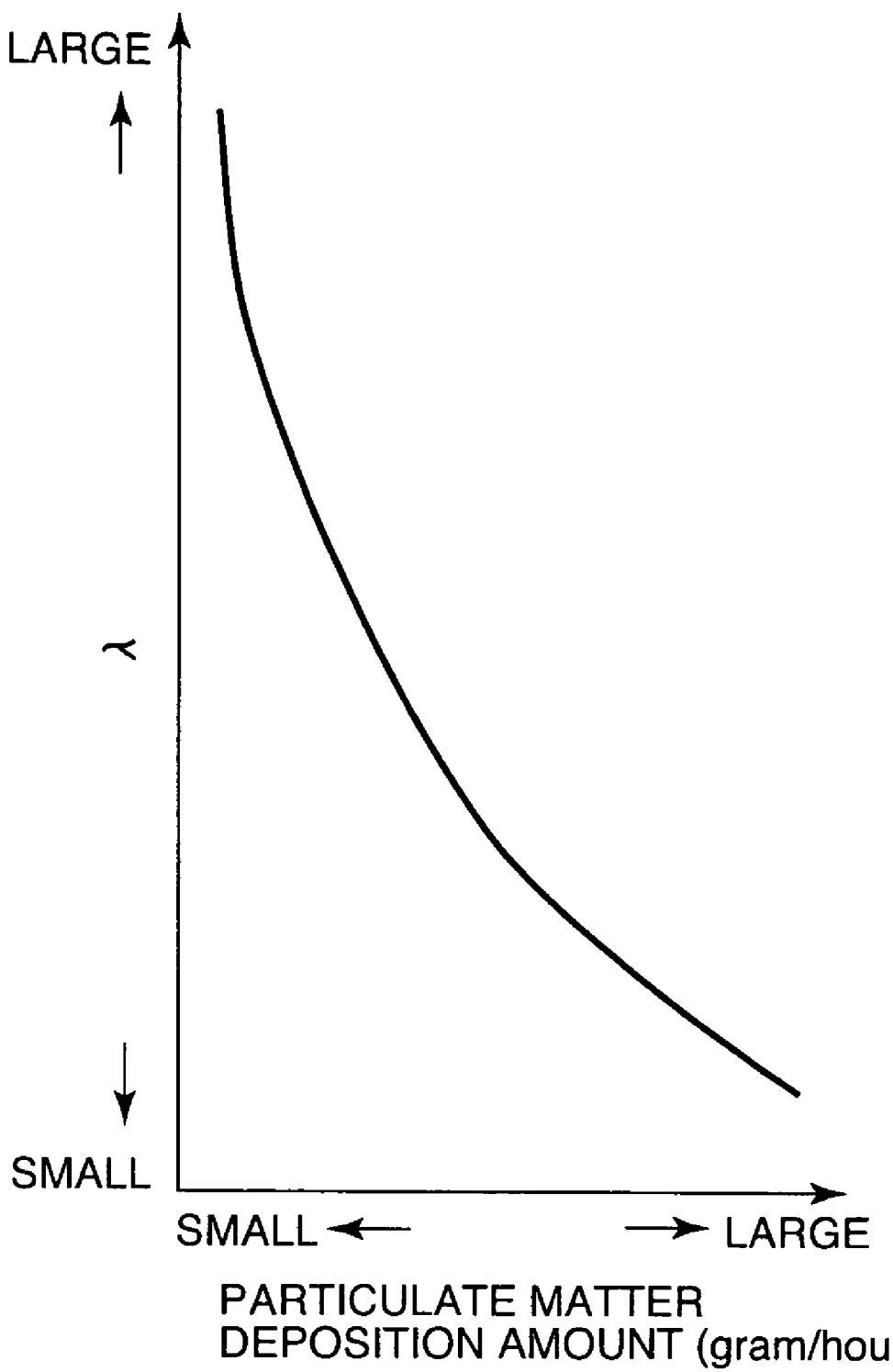
FIG. 10 is a diagram describing the relation of an excess air factor λ of the air-fuel mixture and particulate matter generation amount of the diesel engine.

Referring to FIG. 10, the particulate matter generation amount of the diesel engine 1 largely depends on the excess air factor λ. When the excess air factor λ corresponds to the lean air-fuel ratio, the particulate matter discharge amount is small, but as the excess air factor λ changes from a value corresponding to the stoichiometric air-fuel ratio to a value corresponding to a rich air-fuel ratio, the particulate matter discharge amount markedly increases. Therefore, when regeneration of the NOx trap catalyst 13 is performed at a rich air-fuel ratio, and desulfating of the NOx trap catalyst 13 is performed near the stoichiometric air-fuel ratio, a large amount of particulate matter is generated.

In the state where the particulate matter deposition amount of the DPF 14 exceeds the predetermined amount PM2 in the step S301, if regeneration of the NOx trap catalyst 13 and desulfating are performed, the particulate matter deposition amount of the DPF 14 may increase rapidly during this processing, and disadvantages such as increased exhaust resistance and vehicle stop may occur. Hence, in performing regeneration or desulfating of the NOx trap catalyst 13, it is determined whether or not to perform regeneration of the NOx trap catalyst 13 or desulfating according to the particulate matter deposition amount so that these disadvantages due to the particulate matter deposition of the DPF 14 during the processing period do not occur.

Only when the particulate matter deposition amount of the DPF 14 does not exceed the predetermined amount PM2 in the step S301, the controller 21 performs regeneration of the NOx trap catalyst 13 in the steps S303-S305.

The controller 21 controls the excess air factor λ of the air-fuel mixture in the step S303 to become a value corresponding to a rich air-fuel ratio, i.e., a value smaller than 1.0.

Figure 8:
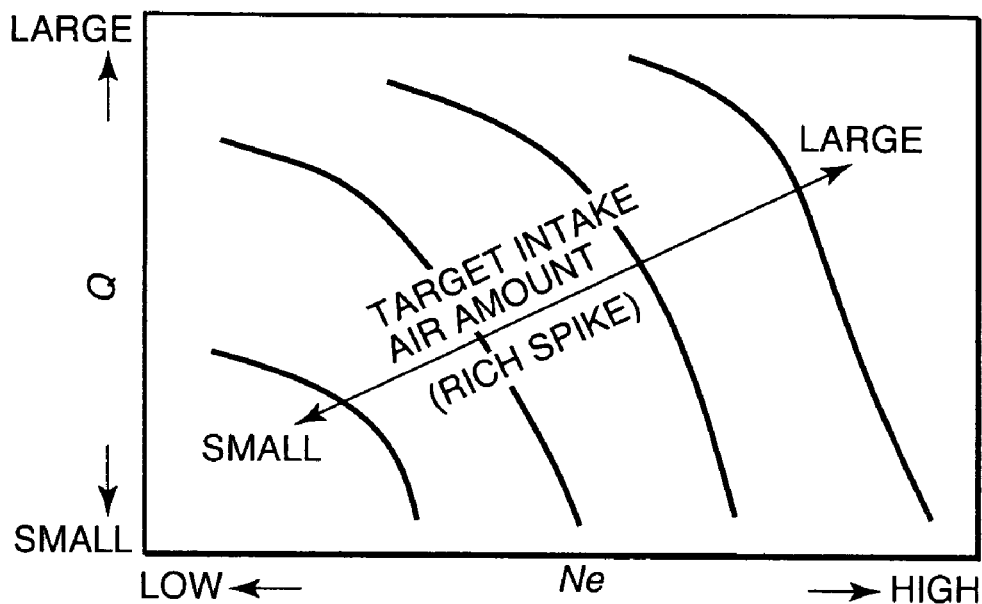
FIG. 8 is a diagram describing the characteristics of a map of a target intake air amount for rich spike operation stored by the controller.

In this control, the controller 21 calculates the predetermined target intake air amount of the rich air-fuel ratio based on the engine speed Ne and the fuel injection amount Q by looking up a map having the characteristics shown in FIG. 8 stored beforehand in the memory (ROM). Referring to FIG. 8, the target intake air volume takes a larger value, the larger the fuel injection amount Q is and the higher the engine speed Ne is. The controller 21 adjusts the opening of the intake throttle 5 so that the calculated target intake air amount may be realized. Preferably, feedback control of the opening of the intake throttle 5 is performed so that the excess air factor $\lambda$ detected by the universal exhaust gas oxygen concentration sensor 26 coincides with the value of a predetermined rich air-fuel ratio.

In the step S304, the controller 21 compares the continuation time t in the state where the excess air factor $\lambda$ is maintained at the value corresponding to a predetermined rich air-fuel ratio, with a predetermined time tspike. The predetermined time tspike is 1 to 2 seconds. When the continuation time t is less than the predetermined time tspike, the controller 21 terminates the routine. When the routine is terminated, the controller 21 immediately resumes execution of the next routine from the step S1 of FIG. 2A. When the excess air factor $\lambda$ is maintained at the predetermined rich air-fuel ratio, the continuation time t accumulates due to repetition of the routine.

When the continuation time t exceeds the predetermined time tspike in the step S304, the controller 21, in the step S305, stops control of the excess air factor $\lambda$ to a value corresponding to a rich air-fuel ratio, resets the NOx trap catalyst regeneration command flag sp to zero in the step S306, and terminates the routine. The operation which makes the excess air factor $\lambda$ of the air-fuel mixture rich for several seconds in this way is called rich spike operation of the air-fuel ratio.

Next, a first regeneration priority determination process will be described referring to FIG. 2E. This process determines the processing priority when the DPF regeneration request flag rq-DPF, and one of the NOx trap catalyst regeneration request flag rq-sp and the desulfating request flag rq-desul, are both unity.

In the step S401, the controller 21 determines whether or not the desulfating request flag rq-desul is unity. When the determination is negative, the controller 21 determines, in the step S402, whether or not the SOx deposition amount exceeds a predetermined amount SOx1 as in the step S13 of FIG. 2A.

When the determination of the step S402 is affirmative, the controller 21, in the step S901 shown in FIG. 2J, sets the desulfating request flag rq-desul to unity, and terminates the routine.

When the determination of the step S402 is negative or when the determination of the step S401 is affirmative, the controller 21, in the step S403, determines whether or not the NOx trap catalyst regeneration request flag rq-sp is unity. When the flag rq-sp is not unity, the controller 21, in the step S404, determines whether or not the NOx deposition amount exceeds the predetermined amount NOx1 as in the step S14 of FIG. 2A.

When the NOx deposition amount exceeds the predetermined amount NOx1, the controller 21, in the step S1001 of FIG. 2K, sets the NOx trap catalyst regeneration request flag rq-sp to unity and terminates the routine.

In the step S404, if the NOx deposition amount does not exceed the predetermined amount NOx1, the controller 21 performs the processing of the step S407.

When the NOx trap catalyst regeneration request flag rq-sp is unity in the step S403, the controller 21, in the step S405, determines whether or not the running conditions of the diesel engine 1 are conditions of small NOx generation amount. The process of FIG. 2E is performed in the case where the DPF regeneration request flag rq-DPF is unity as mentioned above. Therefore, when the NOx trap catalyst regeneration request flag rq-sp is unity, it is necessary to determine whether priority should be given to regeneration of the DPF 14 or the NOx trap catalyst 13. Here, whether or not there is a small NOx generation amount determines the priority. Further, here it may be considered that the case where the diesel engine 1 is in the steady running state, is the running condition where the NOx generation amount is small.

Since, when the NOx generation amount is small, the NOx discharge amount outside the vehicle does not increase even if the regeneration processing of the NOx trap catalyst 13 is somewhat delayed, priority is given to regeneration of the DPF 14 which has a large influence on vehicle running performance.

When the determination of the step S405 is affirmative, the controller 21, in the step S406, compares the temperature of the DPF 14 detected by the DPF temperature sensor 25 with a predetermined temperature T5. The predetermined temperature T5 is the activation temperature of the oxidation catalyst with which the DPF 14 is provided, and is set to 250 to 300 degrees Centigrade.

When the temperature of the DPF 14 exceeds the predetermined temperature T5, the controller 21 performs the processing of the step S407.

When the temperature of the DPF 14 exceeds the predetermined temperature T5 in the step S406, and when the NOx deposition amount does not exceed the predetermined amount NOx1 in the step S404, the controller 21, in the step S407, determines whether or not the present running conditions of the diesel engine 1 are in a DPF regeneration suitability region by looking up the map having the characteristics shown in FIG. 9 which is stored beforehand in the memory (ROM) from the engine speed Ne and the fuel injection amount Q. Referring to FIG. 9, the region where both the engine speed Ne and the fuel injection amount Q are low, is set as a region which is unsuitable for both DPF regeneration and desulfating.

To regenerate the DPF 14, the temperature of the DPF 14 must exceed the predetermined temperature T21. Likewise, to perform desulfating of the NOx trap catalyst 13, the temperature of the NOx trap catalyst 13 must exceed the predetermined temperature T4. The normal exhaust gas temperature of the diesel engine 1 is lower than these two temperatures, so to perform regeneration of the DPF 14 or desulfating of the NOx trap catalyst 13, the exhaust gas temperature must be increased. In this case, there is a correlation between the exhaust gas temperature and excess air factor $\lambda$, and the smaller the excess air factor $\lambda$ is, provided that it is not less than 1.0 corresponding to the stoichiometric air-fuel ratio, the higher the exhaust gas temperature is. However, if the excess air factor $\lambda$ is decreased, the HC and CO amounts in the exhaust gas will increase, and exhaust gas composition will be deteriorated. In other words, there is a trade-off relation between temperature increase characteristics and exhaust gas composition.

The DPF regeneration/desulfating suitability region shown in FIG. 9 is determined beforehand by experiment so that the exhaust gas composition does not become worse than a tolerance value due to a temperature increase operation. In other words, since the exhaust gas composition does become worse than the tolerance value when a temperature increase operation is performed from the DPF regeneration/desulfating unsuitability region, regeneration of the DPF 14 and desulfating of the NOx trap catalyst 13 are not performed in this region.

When the determination result of the step S407 is affirmative, the controller 21 sets the DPF regeneration command flag regl to unity in the step S408, resets the DPF regeneration request flag rq–DPF to zero in the step S409, and terminates the routine. Since the DPF regeneration command flag regl is unity, on the next occasion the routine is executed, the DPF regeneration process of the DPF 14 of FIG. 2A is performed.

When the determination of the step S407 is negative, the controller 21 terminates the routine without setting or resetting any flags.

When the determination of the step S405 or the determination of the step S406 is negative, the controller 21, in the step S410 sets the NOx trap catalyst regeneration command flag sp to unity, in the step S412 resets the NOx trap catalyst regeneration request flag rq–sp, and terminates the routine.

Since the NOx trap catalyst regeneration command flag sp is set to unity, on the next occasion the routine is executed, the regeneration process of the NOx trap catalyst 13 of FIG. 2D is performed.

As mentioned above, in the first regeneration priority determination process of FIG. 2D, when both the DPF regeneration request flag rq–DPF and NOx trap catalyst regeneration request flag rq–sp are unity, the diesel engine 1 is running steady, the temperature of the DPF 14 has exceeded a predetermined temperature T5 equivalent to the catalyst activation temperature and the running conditions of the diesel engine 1 correspond to the regeneration feasibility region of the DPF 14, regeneration of the DPF 14 is given priority by setting the DPF regeneration command flag regl to unity in the step S408, and if any of these conditions is not satisfied, regeneration of the DPF 14 is not performed.

Further, when the diesel engine 1 is not running steady or the temperature of the DPF 14 is equal to or less than the predetermined temperature T5 corresponding to the catalyst activation temperature, in the step S410, the NOx trap catalyst regeneration command flag sp is set to unity and priority is given to regeneration of the NOx trap catalyst 13 over regeneration of the DPF 14. This processing is based on the following reasoning.

Specifically, when the diesel engine 1 is not running steady, the NOx generation amount is large, and if the NOx trap function of the NOx trap catalyst 13 is impaired, a large amount of NOx will be discharged into the atmosphere. For this reason, when the NOx trap catalyst regeneration request flag rq–sp is unity and the diesel engine 1 is not running steady, the NOx trap catalyst 13 must be regenerated at an early stage. Also, when the temperature of the DPF 14 is equal to or less than predetermined temperature T5 corresponding to the activation temperature of the oxidation catalyst, oxidation heat is not obtained since the catalyst is not activated even if the opening of the intake throttle 5 is decreased. Therefore, it takes time for the temperature of the DPF 14 to rise to the regeneration temperature, and since there is concern that a large amount of NOx will be generated during this time, it is preferred in this case also to give priority to regeneration of the NOx trap catalyst 13.

Next, a second regeneration priority determination process will be described referring to FIG. 2F. This process is a process which determines the processing priority when none of the DPF regeneration command flag regl, the desulfating command flag desul, the NOx trap catalyst regeneration command flag sp and the DPF regeneration request flag rq–DPF are unity in the steps S5-S8, and both the NOx trap catalyst regeneration request flag rq–sp and desulfating request flag rq–desul have become unity.

The controller 21, in the step S501, determines whether or not the particulate matter deposition amount DPF 14 has exceeded a predetermined amount PM1. When the particulate matter deposition amount has exceeded the predetermined amount PM1, after setting the DPF regeneration request flag rq–DPF to unity, the routine is terminated in the aforesaid step S801. In other words, if the particulate matter deposition amount has exceeded the predetermined amount PM1, even if both the NOx trap catalyst regeneration request flag rq–sp and desulfating request flag rq–desul are unity, regeneration of the DPF 14 will first be given priority.

When the particulate matter deposition amount of the DPF 14 is equal to or less than the predetermined amount PM1 in the step S501, the controller 21, in the step S502, determines whether or not the catalyst temperature of the NOx trap catalyst 13 detected by the catalyst temperature sensor 23 exceeds the predetermined temperature T1. The predetermined temperature T1 is the activation temperature of the NOx trap catalyst 13, and is set to 250-300 degrees Centigrade.

When the catalyst-temperature of the NOx trap catalyst 13 exceeds the predetermined temperature T1, the controller 21 determines that the temperature conditions are suitable for desulfating the NOx trap catalyst 13, and performs the processing of the steps S503-S505. Specifically, the controller 21 determines, in the step S503, whether or not the present running conditions of the diesel engine 1 are in a desulfating suitability region from the engine speed Ne and the fuel injection amount Q by looking up the map having the characteristics shown in FIG. 9 stored beforehand in the memory (ROM). This determination is substantially identical to the determination of the aforesaid step S407.

When the determination of the step S503 is affirmative, the controller 21, in the step S504, sets the desulfating command flag desul to unity, and after it resets the desulfating request flag rq–desul to zero in the step S505, it terminates the routine. When the determination of the step S503 is negative, the controller 21 terminates the routine without making changes to any of the flags.

On the other hand, when the catalyst temperature of the NOx trap catalyst 13 is less than the predetermined temperature T1 in the step S502, a long time is required for the catalyst temperature to rise to a temperature suitable for desulfating even if the intake throttle 5 is reduced, and the NOx generation amount during this time also increases. In this case, the controller 21 gives priority to regeneration of the NOx trap catalyst 13 over desulfating.

The controller 21, in the step S506, determines whether or not the NOx trap catalyst regeneration request flag rq–sp is unity. When the determination of the step S506 is affirmative, the controller 21 sets the NOx trap catalyst regeneration command flag sp to unity in the step S508, and after it resets the NOx trap catalyst regeneration request flag rq–sp to zero in the step S509, it terminates the routine.

On the other hand, when the determination of the step S506 is negative, in the step S507, the NOx deposition of the NOx trap catalyst 13 is compared with the aforesaid predetermined amount NOx1. When the determination of the step S506 is affirmative, the controller 21, after setting the NOx trap catalyst regeneration request flag rq–sp to unity in the step S1001 shown in FIG. 2K, terminates the routine. When the determination of the step S506 is negative, the controller 21 terminates the routine without making changes to any of the flags.

Next, the heat deterioration prevention process will be described referring to FIG. 2G. The controller 21 terminates or interrupts regeneration of the DPF 14 or desulfating of the NOx trap catalyst 13, and performs this process when the heat deterioration prevention mode flag rec is set to unity in the step S114 or the step S102 of FIG. 2B, or the step S213 or step S202 of FIG. 2C.

In this state, the DPF 14 is at a high temperature, and there is a risk that particulate matter remaining after regeneration of the DPF 14, or particulate matter deposited on the DPF 14 after desulfating of the NOx trap catalyst 13, may all burn at once, and lead to heat deterioration of the DPF 14. Therefore, the controller 21 controls combustion of particulate matter by controlling the oxygen concentration in the exhaust gas to be equal to or less than a predetermined concentration. Here, the predetermined concentration corresponds to an excess air factor $\lambda=1.4$.

In the step S601, the controller 21 calculates a target intake air amount for making the excess air factor $\lambda$ equal to or less than 1.4 from the engine speed Ne and the fuel injection amount Q by looking up a map having the characteristics shown in FIG. 5 stored beforehand in the internal memory (ROM).

The controller 21 adjusts the opening of the intake throttle 5 so that the calculated target intake air amount may be realized. Preferably, feedback control of the opening of the intake throttle 5 is performed so that the excess air factor $\lambda$ detected by the universal exhaust gas oxygen concentration sensor 26 also coincides with a target value equal to or less than 1.4.

After stabilizing the excess air factor $\lambda$ to the target value, the controller 21, in the step S602, determines whether or not the temperature of the DPF 14 detected by the DPF temperature sensor 25 is less than a predetermined temperature T3. The predetermined temperature T3 is the temperature at which there is no risk that the particulate matter deposited on the DPF 14 will oxidize rapidly. Here, the predetermined temperature T3 is set to 500 degrees Centigrade.

In the step S602, when the temperature of the DPF 14 is equal to or greater than the predetermined temperature T3, the controller 21 terminates the routine.

In this case, also on the next occasion the routine is executed, this heat deterioration prevention process is performed to prevent temperature drop of the DPF 14 via control of the excess air factor $\lambda$ in the step S601.

If the temperature of the DPF 14 is less than the predetermined temperature T3 in the step S602, rapid oxidation of particulate matter which would cause heat deterioration of the DPF 14 will not occur even if the oxygen concentration of the exhaust gas increases, so the controller 21, in the step S603, stops control of the excess air-factor $\lambda$.

In the following step S604, after resetting the heat deterioration mode flag rec to zero, the controller 21 terminates the routine.

Next, referring to FIGS. 11A-11D, the effect of executing the aforesaid routine on the particulate matter deposition amount of the DPF 14 will be described.

At a time t0-t1, the particulate matter deposition amount increases according to an elapsed running time. During this time, if a request to regenerate the NOx trap catalyst 13 is issued, the NOx trap catalyst regeneration process by the steps S301-S306 of FIG. 2D is performed, and rich spike operation of the air-fuel ratio is performed. The period expressed by R/S in the figure is the continuation time of rich spike operation. As shown in FIG. 11B, the paarticulate matter deposition amount of the DPF 14 increases during rich spike. Moreover, as shown in FIG. 11C, the catalyst temperature of the DPF 14 also rises during rich spike.

When the increasing particulate matter deposition amount exceeds the predetermined amount PM1, the determination of the step S12 of FIG. 2A changes to affirmative, and in the step S801, the DPF regeneration request flag rq–DPF is set to unity. On the next occasion the routine is executed, the determination of the step S8 is affirmative, and if regeneration conditions are satisfied, in the step S408, the DPF regeneration command flag regl is set to unity.

As a result, on the next occasion the routine is executed, the regeneration process of the DPF 14 is performed by the steps S101-S114 of FIG. 2B.

In the regeneration process of the DPF 14, since the temperature of the DPF 14 is initially lower than the predetermined temperature T21, the temperature is increased by operation of the intake throttle 5 in the step S105. As a result, at a time t2, the temperature of the DPF 14 exceeds the predetermined temperature T21. Subsequently, during a time t2-t3, in the steps S107-S111, the temperature of the DPF 14 is maintained between the predetermined temperatures T21, T22, and the excess air factor $\lambda$ is controlled to a lean air-fuel ratio equivalent value. Hence, the particulate matter deposited on the DPF 14 burns, and in the DPF 14, the particulate matter deposition amount decreases as shown in FIG. 11B.

At the time t3, the load and speed of the diesel engine 1 become lower than the region in which regeneration is possible as shown in FIG. 11D despite not having completed regeneration of the DPF 14. As a result, the controller 21 stops the regeneration process of the DPF 14 of FIG. 2B, and sets the heat deterioration mode flag rec to unity in the step S102. Correspondingly, the controller 21, on the next occasion the routine is executed, performs the heat deterioration prevention process shown in FIG. 2G. Therefore, as shown in FIG. 11C, the temperature of the DPF 14 falls.

When, at a time t4, the temperature of the DPF 14 is less than the predetermined temperature T3, the controller 21 terminates the heat deterioration prevention process. The particulate matter deposition amount of the DPF 14 which increases again after the regeneration process of the DPF 14 is stopped, already exceeds the predetermined amount PM1 at the time T4. However, since the load and speed of the diesel engine 1 are still below the regeneration feasibility region, regeneration of the DPF 14 is not performed. On the other hand, although regeneration of the NOx trap catalyst 13 is possible also under low rotation speed, low load conditions and the particulate matter deposition amount of the DPF 14 exceeds the predetermined amount PM1, it does not exceed the predetermined amount PM2. Therefore, in this state, whenever the NOx deposition amount of the NOx trap catalyst 13 exceeds the predetermined amount NOx1, the controller 21 performs the regeneration process of the NOx trap catalyst 13 by the steps S301-S306 of FIG. 2D, i.e., rich spike operation.

As shown in FIG. 11B, during rich spike, the increase rate of the particulate matter deposition amount of the DPF 14 becomes larger. Also, the temperature of the DPF 14 rises temporarily.

At a time t5, the particulate matter deposition amount of the DPF 14 exceeds the predetermined amount PM2. Therefore, after the time t5, even if the NOx deposition amount of the NOx trap catalyst 13 exceeds the predetermined amount NOx1, the regeneration process of the NOx trap catalyst 13 is not performed.

In the NOx regeneration process of FIG. 2D, the regeneration process of the NOx trap catalyst 13 is performed only when the particulate matter deposition amount of the DPF 14 does not exceed the predetermined amount PM2 in the step S301. When the step S301 does not exist, as shown by the dashed line of FIG. 11A, whenever the NOx deposition amount of the NOx trap catalyst 13 exceeds the predetermined amount NOx1, rich spike operation is performed regardless of the particulate matter deposition amount of the DPF 14. Therefore, as shown in FIG. 11B, the particulate matter deposition amount of the DPF 14 increases sharply, and this may increase exhaust gas discharge resistance and make vehicle running difficult.

Also in the desulfating process shown in FIG. 2C, the desulfating process is performed only in the case where the particulate matter deposition amount of the DPF 14 does not exceed the predetermined amount PM2.

As described above, according to this invention, as shown in the steps S204 and S215 of FIG. 2C, and the steps S301 and S302 of FIG. 2D, if the particulate matter deposition amount of the DPF 14 exceeds the predetermined amount PM2, regeneration of the NOx trap catalyst 13 or desulfating will not be performed. This prevents increase of the particulate matter deposition amount of the DPF 14 due to regeneration or desulfating of the NOx trap catalyst 13, which leads to increase of exhaust gas resistance or stopping of the vehicle.

In the first regeneration priority determination process of FIGS. 2E, when a request for regeneration of the DPF 14 and desulfating of the NOx trap catalyst 13 or a request for regeneration of the NOx trap catalyst 13 overlap, priority is given to regeneration of the DPF 14 which directly affects the running performance of the diesel engine 1. Due to this measure, impairment of the running performance of the diesel engine 1 is prevented. On the other hand, as shown in the step S406, when the temperature of the DPF 14 is unsuitable for regeneration, regeneration of the NOx trap catalyst 13 is performed preferentially. For example immediately after starting of the diesel engine 1, if the DPF 14 is not activated, even if the exhaust gas temperature rises, time is required until regeneration of the DPF 14 becomes possible due to heat inertia.

In this situation, by performing regeneration of the NOx trap catalyst 13 by rich spike operation, not only is the NOx trap catalyst 13 regenerated, but the temperature of the DPF 14 can be increased promptly by using the rise of exhaust gas temperature due to rich spike.

In the desulfating process of the NOx trap catalyst 13 of FIG. 2C, the controller 21, in the step S214, resets the NOx trap catalyst regeneration request flag rq–sp to zero at the same time as desulfating is completed. As a result, the calculation of the NOx deposition amount is temporarily cleared. This is because regeneration of the NOx trap catalyst is performed simultaneously with the desulfating operation. By clearing the NOx trap catalyst regeneration request flag rq–sp when desulfating is completed, the regeneration frequency of the NOx trap catalyst 13 can be prevented from increasing more than necessary.

In the regeneration process of the DPF 14 of FIG. 2B, or the desulfating process of FIG. 2C, the controller 21 sets the heat deterioration mode flag rec to unity after the termination of each process. As a result, the heat deterioration prevention process of FIG. 2G is performed without fail after these processes have terminated, and the temperature of the DPF 14 can be decreased promptly.

In the second regeneration priority determination process of FIG. 2F, if a request to desulphate the NOx trap catalyst 13 and a request to regenerate the NOx trap catalyst 13 overlap, when the catalyst temperature of the NOx trap catalyst 13 exceeds the predetermined temperature T1, priority is given to the desulfating operation, and when it is equal to or less than the predetermined temperature T1, priority is given to regeneration of the NOx trap catalyst 13.

For example immediately after starting the diesel engine 1, if the DPF 14 is not activated, even if the exhaust gas temperature rises, some time is required until desulfating of the NOx trap catalyst 13 becomes possible due to heat inertia.

In such a situation, by giving priority to regeneration of the NOx trap catalyst 13 by rich spike operation, not only is regeneration of the NOx trap catalyst 13 performed, but the temperature of the NOx trap catalyst 13 can be increased promptly using the rise of exhaust gas temperature due to rich spike.

The contents of Tokugan 2004-379560, with a filing date of Dec. 28, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiments, one each of the NOx trap catalyst 13 and the DPF 14 are disposed in series in the exhaust passage 10. However, this invention can be applied to a diesel engine provided with at least one DPF in the exhaust passage. In other words, when the particulate matter deposition amount of the DPF has exceeded the predetermined amount PM2, if a rich air-fuel ratio is applied, the particulate matter discharge amount of the diesel engine increases rapidly. To prevent the particulate matter deposition amount of the DPF from reaching a limit due to rapidly increasing particulate matter, when the particulate matter deposition amount has exceeded the predetermined amount PM2, prohibition of a rich air-fuel ratio has a desirable effect in controlling the particulate matter discharge amount even in a diesel engine which does not have a NOx trap catalyst.

In the above embodiment, temperature increase operation of the DPF 14 in the steps S105, S206 and control of the air excess factor λ in the steps S106, S207, S303 are both performed by operation of the intake throttle 5, and temperature control of the DPF 14 in the steps S108, S110 is performed by fuel injection. Various alternative methods may be used to perform temperature increase operation and temperature control of the DPF 14, or control of the exhaust gas composition of the diesel engine 1. This invention is not dependent on the method used to perform temperature increase operation or temperature control of the DPF 14, or control of the exhaust gas composition of the diesel engine 1.

The embodiments of this invention in which an exclusive property or privilege is claimed are defined as follows:

What is claimed is:

1. An exhaust gas purification device for a diesel engine, comprising:
    a diesel particulate filter which traps particulate matter contained in an exhaust gas of the diesel engine;
    an adjusting device which adjusts an oxygen concentration of the exhaust gas flowing into the filter;
    a nitrogen oxide trap catalyst which, when the oxygen concentration of the exhaust gas of the diesel engine is higher than a value corresponding to a stoichiometric air-fuel ratio, traps nitrogen oxides contained in the exhaust gas, and when the oxygen concentration of the exhaust gas is less than a value corresponding to the stoichiometric air-fuel ratio, reduces trapped nitrogen oxides; and
    a controller programmed to:
        calculate a particulate matter deposition amount in the filter;
        control the adjusting device, when the particulate matter deposition amount exceeds a first predetermined amount, so that the oxygen concentration of the exhaust gas does not become a value corresponding to a rich air-fuel ratio;
        control the adjusting device, when the particulate matter deposition amount exceeds a second predetermined amount smaller than the first predetermined amount, to perform a filter regeneration operation, wherein the filter regeneration operation includes an operation to maintain the oxygen concentration of the exhaust gas at a value corresponding to a lean air-fuel ratio while maintaining a temperature of the filter at a predetermined regeneration temperature;

calculate a nitrogen oxide deposition amount on the nitrogen oxide trap catalyst, and control the adjusting device, when the nitrogen oxide deposition amount exceeds a predetermined nitrogen oxide deposition amount, to perform a nitrogen oxide trap catalyst regeneration operation including an operation to maintain the oxygen concentration of the exhaust gas at a value corresponding to a rich air-fuel ratio; and control the adjusting device, when the particulate matter deposition amount exceeds the first predetermined amount, so as not to perform the nitrogen oxide trap catalyst regeneration operation even when the nitrogen oxide deposition amount exceeds the predetermined nitrogen oxide deposition amount.

2. The exhaust gas purification device as defined in claim 1, wherein the controller is further programmed to, when the particulate matter deposition amount exceeds the second predetermined amount and the nitrogen oxide deposition amount exceeds the predetermined nitrogen oxide deposition amount, while the diesel engine is not running steady, give priority to the nitrogen oxide trap catalyst regeneration operation over the filter regeneration operation.

3. The exhaust gas purification device as defined in claim 1, wherein the controller is further programmed to, when, the particulate matter deposition amount exceeds the second predetermined amount and the nitrogen oxide deposition amount exceeds the predetermined nitrogen oxide deposition amount, while the temperature of the filter does not reach a predetermined activation temperature, give priority to the nitrogen oxide trap catalyst regeneration operation over the filter regeneration operation.

4. The exhaust gas purification device as defined in claim 1, wherein the nitrogen oxide trap catalyst traps sulfur oxides contained in the exhaust gas of the diesel engine and releases trapped sulfur oxides at high temperature, and the controller is further programmed to calculate a sulfur oxide deposition amount of the nitrogen oxide trap catalyst, and when the sulfur oxide deposition amount exceeds a predetermined sulfur oxide deposition amount, control the adjusting device to perform a desulfating operation, wherein the desulfating operation includes an operation to maintain temperature of the nitrogen oxide trap catalyst in a predetermined high temperature state.

5. The exhaust gas purification device as defined in claim 4, wherein the controller is further programmed to, when the particulate matter deposition amount exceeds the first predetermined amount, control the adjusting device so as to not perform the desulfating operation even if the sulfur oxide deposition amount exceeds the predetermined sulfur oxide deposition amount.

6. The exhaust gas purification device as defined in claim 4, wherein the controller is further programmed to, when the particulate matter deposition amount does not exceed the second predetermined amount, when the nitrogen oxide deposition amount exceeds the predetermined nitrogen oxide deposition amount and when the sulfur oxide deposition amount exceeds the predetermined sulfur oxide deposition amount, while the nitrogen oxide trap catalyst is at a higher temperature than a predetermined activation temperature, give priority to the desulfating operation over the nitrogen oxide trap catalyst regeneration operation, and when the nitrogen oxide trap catalyst is not at a higher temperature than the predetermined activation temperature, give priority to the nitrogen oxide trap catalyst regeneration operation over the desulfating operation.

7. The exhaust gas purification device as defined in claim 4, wherein the controller is further programmed to, when a predetermined desulfating condition is not satisfied, not perform the desulfating operation even if the sulfur oxide deposition amount exceeds the predetermined sulfur oxide deposition amount.

8. The exhaust gas purification device as defined in claim 7, wherein the predetermined desulfating condition corresponds to a rotation speed of the diesel engine being equal to or greater than a predetermined rotation speed, and a load of the diesel engine being equal to or greater than a predetermined load.

* * * * *